(12) United States Patent
Liu et al.

(10) Patent No.: US 11,995,375 B2
(45) Date of Patent: May 28, 2024

(54) AUDIO STREAM SWITCHING METHOD AND APPARATUS

(71) Applicant: Huawei Technologies Co., Ltd., Guangdong (CN)

(72) Inventors: Chao Liu, Nanjing (CN); Jie Xiong, Nanjing (CN); Jinhui Zhang, Shenzhen (CN); Lihong Feng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 351 days.

(21) Appl. No.: 17/345,689

(22) Filed: Jun. 11, 2021

(65) Prior Publication Data

US 2021/0303259 A1 Sep. 30, 2021

Related U.S. Application Data

(63) Continuation of application No. PCT/CN2019/123728, filed on Dec. 6, 2019.

(30) Foreign Application Priority Data

Dec. 13, 2018 (CN) .......................... 201811526743.7

(51) Int. Cl.
*G06F 3/16* (2006.01)
*G10L 19/008* (2013.01)

(52) U.S. Cl.
CPC ............ *G06F 3/165* (2013.01); *G10L 19/008* (2013.01)

(58) Field of Classification Search
CPC ...................................................... G06F 3/165
(Continued)

(56) References Cited

U.S. PATENT DOCUMENTS

2010/0202405 A1* 8/2010 Li .......................... H04H 20/26
370/331
2014/0375889 A1 12/2014 Cho et al.
(Continued)

FOREIGN PATENT DOCUMENTS

CN 102291399 A 12/2011
CN 102347042 A 2/2012
(Continued)

OTHER PUBLICATIONS

SMPTE ST 2110-30:2017, Smpte Standard, Professional Media Over Managed IP Networks: PCM Digital Audio, total 9 pages.

*Primary Examiner* — Katherine A Faley
(74) *Attorney, Agent, or Firm* — WOMBLE BOND DICKINSON (US) LLP

(57) ABSTRACT

This application discloses an audio stream switching method and apparatus. After a switching device receives a switching instruction, the switching device determines a synchronization relationship between a switch-in stream and a switch-out stream, determines a parameter value of a switching point of the switch-in stream based on the synchronization relationship and a timestamp of a packet in the switch-in stream, and determines a timestamp of a switching point of the switch-out stream based on the synchronization relationship and a timestamp of a packet in the switch-out stream, and/or the switching device switches a packet that is in the switch-out stream and whose parameter value is greater than the parameter value of the switching point of the switch-out stream to a packet that is in the switch-in stream and whose parameter value is greater than the parameter value of the switching point of the switch-in stream.

16 Claims, 12 Drawing Sheets

(58) Field of Classification Search
USPC .......................................................... 381/80
See application file for complete search history.

(56) References Cited

U.S. PATENT DOCUMENTS

2016/0029075 A1  1/2016  Erickson
2017/0126767 A1  5/2017  Cai

FOREIGN PATENT DOCUMENTS

| CN | 103812842 A | 5/2014 |
| CN | 103907358 A | 7/2014 |
| CN | 105657579 A | 6/2016 |
| CN | 105979347 A | 9/2016 |
| CN | 106488255 A | 3/2017 |
| CN | 106921885 A | 7/2017 |
| CN | 107197394 A | 9/2017 |
| CN | 108540734 A | 9/2018 |
| JP | 2010239171 A | 10/2010 |

* cited by examiner

| Switching flow table | Switching point calculation finish flag F_FSW |
| --- | --- |
| | Learning phase finish flag F_FL |
| | Learning flag F_LN |
| | Sequence number offset SN_OFST |
| | Switching point sequence number SN |
| | Switching point timestamp TS_SW |
| | Sampling rate F_SMPL |
| | Packet duration T_PKT |
| | Sequence number difference sum SUM_DSEQ |
| | Timestamp difference sum SUM_DTS |
| | Sequence number SN |
| | Timestamp TS |
| | Stream type TYPE |

FIG. 6

AUDIO STREAM SWITCHING METHOD AND APPARATUS

CROSS-REFERENCE TO RELATED APPLICATIONS

This application is a continuation of International Application No. PCT/CN2019/123728, filed on Dec. 6, 2019, which claims priority to Chinese Patent Application No. 201811526743.7, filed on Dec. 13, 2018, both of which are hereby incorporated by reference in their entireties.

TECHNICAL FIELD

This application relates to the field of multimedia communications technologies, and in particular, to an audio stream switching method and apparatus.

BACKGROUND

In the field of multimedia communications technologies, for example, in the field of television (television, TV) production and broadcasting, there is a scenario in which audio streams sent by different audio devices are switched between each other.

In a current audio stream switching solution, for example, the following operation needs to be performed when a switch-out stream is switched to a switch-in stream: After data is parsed out from a packet of the switch-in stream and data is parsed out from a packet of the switch-out stream, the parsed-out data of the switch-in stream and the parsed-out data of the switch-out stream are both converted into a format applicable to an audio switching matrix and then are input into the audio switching matrix for switching. As a result, switching efficiency is relatively low and system complexity is relatively high.

SUMMARY

Embodiments of this application provide an audio stream switching method and apparatus, to resolve a problem of low efficiency and high complexity in the prior art.

In some embodiments (sometimes referred to as, "a first aspect") the present application provides an audio stream switching method, including:

a switching device receives (e.g., retrieves, obtains, acquires) a switching instruction, where the switching instruction instructs to switch from a transmitted first audio stream to a second audio stream; the switching device determines (e.g., identifies, assesses) a synchronization relationship between the first audio stream and the second audio stream based on a timestamp of a first packet of the first audio stream and/or a timestamp of a second packet of the second audio stream, where receiving time of the first packet is the same as receiving time of the second packet; the switching device determines a parameter value of a switching point of the first audio stream based on the synchronization relationship and/or the timestamp of the first packet, and/or determines a parameter value of a switching point of the second audio stream based on the synchronization relationship and/or the timestamp of the second packet, where the parameter value of the switching point is a timestamp of the switching point or a sequence number of the switching point; and/or the switching device switches a packet that is in the first audio stream and/or whose parameter value is greater than the parameter value of the switching point of the first audio stream to a packet that is in the second audio stream and/or whose parameter value is greater than the parameter value of the switching point of the second audio stream.

For example, a packet included in an audio stream may be a real-time transport protocol (real-time transport protocol, RTP) packet.

In some embodiments, when a switch-out stream is switched to a switch-in stream, instead of performing switching after parsing out data from the switch-in stream and/or parsing out data from the switch-out stream and/or converting both the parsed-out data of the switch-in stream and/or the parsed-out data of the switch-out stream into a format applicable to an audio switching matrix, a synchronization relationship is determined based on a timestamp of a packet in the switch-out stream and/or a timestamp of a packet in the switch-in stream, and/or switching points are determined based on the synchronization relationship to perform (e.g., execute, implement) switching, thereby improving switching efficiency and reducing system complexity to a specific extent.

In some embodiments, that the switching device determines a synchronization relationship between the first audio stream and/or the second audio stream based on a timestamp of a first packet of the first audio stream and/or a timestamp of a second packet of the second audio stream includes:

when a sampling frequency of the first audio stream is different from a sampling frequency of the second audio stream, the switching device unifies the timestamp of the first packet and/or the timestamp of the second packet based on the sampling frequency of the first audio stream and/or the sampling frequency of the second audio stream and/or based on a reference sampling frequency; and/or the switching device determines the synchronization relationship between the first audio stream and/or the second audio stream based on a unified timestamp of the first packet and/or a unified timestamp of the second packet.

The sampling frequency of the first audio stream is determined based on timestamps of N received packets in the first audio stream, the sampling frequency of the second audio stream is determined based on timestamps of M received packets in the second audio stream, and/or both M and N are positive integers. The reference sampling frequency is the sampling frequency of the first audio stream, the sampling frequency of the second audio stream, or a preset sampling frequency.

In some embodiments, when a sampling frequency of a switch-in stream is different from a sampling frequency of a switch-out stream, a synchronization relationship between the two audio streams is determined after a timestamp of a packet in the switch-in stream and/or a timestamp of a packet in the switch-out stream are unified by using a reference sampling frequency, so that accuracy of determining the synchronization relationship can be improved to a specific extent.

In some embodiments, the sampling frequency of the first audio stream and the sampling frequency of the second audio stream are determined in the following manner:

The switching device obtains a first timestamp increment group of the first audio stream and/or a second timestamp increment group of the second audio stream. The first timestamp increment group includes N−1 first timestamp increments determined based on the timestamps of the N packets, and/or the second timestamp increment group includes M−1 second timestamp increments determined based on the timestamps of the M packets. The first timestamp increment is a timestamp difference between two consecutively received packets in the first audio stream, and/or the second timestamp increment is a timestamp difference between two consecutively received packets in the second audio stream; or the first timestamp increment is a timestamp difference between received adjacent packets in the first audio stream, and/or the second timestamp increment is a timestamp difference between received adjacent packets in the second audio stream. The switching device determines the sampling frequency of the first audio stream based on the first timestamp increment group, and/or determines the sampling frequency of the second audio stream based on the second timestamp increment group.

In some embodiments, a sampling frequency is determined by using a packet timestamp increment, which is easy to implement and has low complexity.

In some embodiments, the N packets are the first N packets in the first audio stream that are received after the switching instruction is received, the M packets are the first M packets in the second audio stream that are received after the switching instruction is received, and N is equal to M.

In some embodiments, a sampling frequency is determined after a switching instruction is received, so that several audio streams whose sampling frequencies need to be determined can be determined accordingly, thereby improving resource utilization to a specific extent.

In some embodiments, the first packet is a packet that is in the first audio stream and/or that is received when the sampling frequency of the first audio stream is determined, and/or the second packet is a packet that is in the second audio stream and/or that is received when audio information of the second audio stream is determined.

In some embodiments, a packet received when a sampling frequency is determined is selected for determining a switching point, so that a switching latency can be reduced to a specific extent.

In some embodiments, that the switching device determines a parameter value of a switching point of the first audio stream based on the synchronization relationship and/or the timestamp of the first packet, and/or determines a parameter value of a switching point of the second audio stream based on the synchronization relationship and the timestamp of the second packet includes: the switching device determines the parameter value of the switching point of the first audio stream based on the synchronization relationship, the timestamp of the first packet, and/or packet timepacket time of the first audio stream, and/or determines the parameter value of the switching point of the second audio stream based on the synchronization relationship, the timestamp of the second packet, and/or packet timepacket time of the second audio stream, where the packet timepacket time of the first audio stream is determined based on the timestamps of the N packets, and/or the packet timepacket time of the second audio stream is determined based on the timestamps of the M packets.

The foregoing embodiments provides another easy-to-implement manner for determining a switching point.

In some embodiments, a packet timestamp of the switching point of the first audio stream and/or a packet timestamp of the switching point of the second audio stream meet the following condition:

if it is determined, based on the unified timestamp of the first packet and the unified timestamp of the second packet, that the first audio stream and the second audio stream are synchronized, $TS_{i\_}SW=TS_i+K1/ti\_pkt*dts_i$ and $TS_{o\_}SW=TS_o+K1/to\_pkt*dts_o$; or if the unified timestamp of the first packet is later than the unified timestamp of the second packet, $TS_{i\_}SW=TS_i+K1/ti\_pkt*dts_i$ and $TS_{o\_}SW=TS_o+(t_{nsync}+K1)/to\_pkt*dts_o$; or if the unified timestamp of the first packet is earlier than the unified timestamp of the second packet, $TS_{i\_}SW=TS_i+(t_{nsync}+K2)/ti\_pkt*dts_i$ and $TS_{o\_}SW=TS_o+K2/to\_pkt*dts_o$.

$t_{nsync}=|TS_o^0-TS_i^0|/f_{io}$, $TS_o^0$ represents the unified timestamp of the first packet, $TS_i^0$ represents the unified timestamp of the second packet, $f_{io}$ represents the reference sampling frequency, $TS_{i\_}SW$ represents the timestamp of the switching point of the second audio stream, $TS_i$ represents the un-unified timestamp of the second packet, ti_pkt represents the packet timepacket time of the second audio stream, $dts_i$ represents a theoretical value that is of a timestamp difference between adjacent packets and/or that corresponds to the sampling frequency of the second audio stream, $TS_{o\_}SW$ represents the timestamp of the switching point of the first audio stream, $TS_o$ represents the un-unified timestamp of the first audio stream, to_pkt represents the packet timepacket time of the first audio stream, $dts_o$ represents a theoretical value that is of a timestamp difference between adjacent packets and that corresponds to the sampling frequency of the first audio stream, K1 represents first preset duration, and K2 represents second preset duration.

In some embodiments, when a switching point is determined, specific duration is added, and/or is used as a timestamp of the switching point, which can avoid disorder, and/or save resources compared with an existing manner in which a latency of a switching point is prestored.

In some embodiments, packet timepacket time of a to-be-determined audio stream meets the following condition, and/or the to-be-determined audio stream is the first audio stream or the second audio stream:

if $\overline{dTS}_{real}<dTS_{thres}$, the packet timepacket time of the to-be-determined audio stream is a first value; or if $\overline{dTS}_{real}\geq dTS_{thres}$, the packet timepacket time of the to-be-determined audio stream is a second value.

$$\overline{dTS}_{real} = \frac{\sum_{i=1}^{w} dTS_i}{\sum_{i=1}^{w} dSEQ_i}, \overline{dTS}_{real}$$

represents a timestamp increment average determined based on a timestamp increment group of the to-be-determined audio stream, $dTS_{thres}$ is related to theoretical values that are of a timestamp difference between adjacent packets and/or that correspond to different packet timepacket time, $dTS_i$ represents an $i^{th}$ timestamp increment in the timestamp increment group of the to-be-determined audio stream, $dSEQ_i$ represents a sequence number difference between two packets corresponding to the $i^{th}$ timestamp increment, and/or w represents a quantity of timestamp increments in the timestamp increment group of the to-be-determined audio stream.

In some embodiments, that the switching device determines the sampling frequency of the first audio stream based on the first timestamp increment group includes:

performing linear fitting based on the N−1 first timestamp increments, a sequence number difference between two packets corresponding to each first timestamp increment, and theoretical values that are of a timestamp difference between adjacent packets and/or that respectively correspond to a plurality of theoretical sampling frequencies supported by the switching device, to obtain a plurality of first fitting errors; determining a theoretical value that is of a timestamp difference between adjacent packets and/or that corresponds to a minimum first fitting error in the plurality of first fitting errors; and/or using a theoretical sampling frequency corresponding to the theoretical value that is of a timestamp difference between adjacent packets and/or that corresponds to the minimum first fitting error as the sampling frequency of the first audio stream; or that the switching device determines the sampling frequency of the second audio stream based on the second timestamp increment group includes: performing linear fitting based on the M−1 second timestamp increments, a timestamp difference between two packets corresponding to each second timestamp increment, and theoretical values that are of a timestamp difference between adjacent packets and/or that respectively correspond to a plurality of theoretical sampling frequencies supported by the switching device, to obtain a plurality of second fitting errors; determining a theoretical value that is of a timestamp difference between adjacent packets and that corresponds to a minimum second fitting error in the plurality of second fitting errors; and/or using a theoretical sampling frequency corresponding to the theoretical value that is of a timestamp difference between adjacent packets and/or that corresponds to the minimum second fitting error as the sampling frequency of the second audio stream.

In some embodiments, a sampling frequency is determined in a fitting manner, which is easy to implement and has relatively low complexity.

In some embodiments (sometimes referred to as, "a second aspect") the present application provides an audio stream switching apparatus. The apparatus may be applied to a switching device. For beneficial effects, refer to the description in the first aspect. Details are not described herein again. The apparatus has a function of implementing behavior in the method embodiment in the first aspect. The function may be implemented by using hardware, or may be implemented by using hardware to execute corresponding software. The hardware or software includes one or more modules corresponding to the function.

For example, the apparatus includes a receiving unit, a processing unit, and a sending unit.

The receiving unit is configured to receive a switching instruction, where the switching instruction instructs to switch from a transmitted first audio stream to a second audio stream.

The processing unit is configured to determine a synchronization relationship between the first audio stream and the second audio stream based on a timestamp of a first packet of the first audio stream and/or a timestamp of a second packet of the second audio stream, where receiving time of the first packet is the same as receiving time of the second packet; and determine a parameter value of a switching point of the first audio stream based on the synchronization relationship and the timestamp of the first packet, and/or determine a parameter value of a switching point of the second audio stream based on the synchronization relationship and/or the timestamp of the second packet, where the parameter value of the switching point is a timestamp of the switching point or a sequence number of the switching point.

The sending unit is configured to switch a packet that is in the first audio stream and whose parameter value is greater than the parameter value of the switching point of the first audio stream to a packet that is in the second audio stream and/or whose parameter value is greater than the parameter value of the switching point of the second audio stream.

In some embodiments, when determining the synchronization relationship between the first audio stream and/or the second audio stream based on the timestamp of the first packet of the first audio stream and the timestamp of the second packet of the second audio stream, the processing unit is configured to:

when a sampling frequency of the first audio stream is different from a sampling frequency of the second audio stream, unify the timestamp of the first packet and/or the timestamp of the second packet based on the sampling frequency of the first audio stream and/or the sampling frequency of the second audio stream and/or based on a reference sampling frequency; and/or determine the synchronization relationship between the first audio stream and the second audio stream based on a unified timestamp of the first packet and/or a unified timestamp of the second packet.

The sampling frequency of the first audio stream is determined based on timestamps of N received packets in the first audio stream, the sampling frequency of the second audio stream is determined based on timestamps of M received packets in the second audio stream, and/or both M and N are positive integers. The reference sampling frequency is the sampling frequency of the first audio stream, the sampling frequency of the second audio stream, or a preset sampling frequency.

In some embodiments, the processing unit is configured to obtain the sampling frequency of the first audio stream and/or the sampling frequency of the second audio stream in the following manner:

obtaining a first timestamp increment group of the first audio stream and/or a second timestamp increment group of the second audio stream, where the first timestamp increment group includes N−1 first timestamp increments determined based on the timestamps of the N packets, and/or the second timestamp increment group includes M−1 second timestamp increments determined based on the timestamps of the M packets; and/or the first timestamp increment is a timestamp difference between two consecutively received packets in the first audio stream, and/or the second timestamp increment is a timestamp difference between two consecutively received packets in the second audio stream; or the first timestamp increment is a timestamp difference between received adjacent packets in the first audio stream, and/or the second timestamp increment is a timestamp difference between received adjacent packets in the second audio stream; and/or determining the sampling frequency of the first audio stream based on the first timestamp increment group, and/or determining the sampling frequency of the second audio stream based on the second timestamp increment group.

In some embodiments, the N packets are the first N packets in the first audio stream that are received after the switching instruction is received, the M packets are the first M packets in the second audio stream that are received after the switching instruction is received, and/or N is equal to M.

In some embodiments, the first packet is a packet that is in the first audio stream and/or that is received when the sampling frequency of the first audio stream is determined, and/or the second packet is a packet that is in the second audio stream and/or that is received when audio information of the second audio stream is determined.

In some embodiments, when determining the parameter value of the switching point of the first audio stream based on the synchronization relationship and the timestamp of the first packet, and/or determining the parameter value of the switching point of the second audio stream based on the synchronization relationship and/or the timestamp of the second packet, the processing unit is configured to:

determine the parameter value of the switching point of the first audio stream based on the synchronization relationship, the timestamp of the first packet, and/or packet timepacket time of the first audio stream, and/or determine the parameter value of the switching point of the second audio stream based on the synchronization relationship, the timestamp of the second packet, and/or packet time of the second audio stream.

The packet time of the first audio stream is determined based on the timestamps of the N packets, and/or the packet time of the second audio stream is determined based on the timestamps of the M packets.

In some embodiments, a packet timestamp of the switching point of the first audio stream and/or a packet timestamp of the switching point of the second audio stream meet the following condition:

if it is determined, based on the unified timestamp of the first packet and/or the unified timestamp of the second packet, that the first audio stream and/or the second audio stream are synchronized, $TS_i\_SW=TS_i+K1/ti\_pkt*dts_i$ and $TS_o\_SW=TS_o+K1/to\_pkt*dts_o$; or if the unified timestamp of the first packet is later than the unified timestamp of the second packet, $TS_i\_SW=TS_i+K1/ti\_pkt*dts_i$ and $TS_o\_SW=TS_o+(t_{nsync}+K1)/to\_pkt*dts_o$; or if the unified timestamp of the first packet is earlier than the unified timestamp of the second packet, $TS_i\_SW=TS_i+(t_{nsync}+K2)/ti\_pkt*dts_i$ and $TS_o\_SW=TS_o+K2/to\_pkt*dts_o$.

$t_{nsync}=|TS_o^0-TS_i^0|/f_{io}$, $TS_o^0$ represents the unified timestamp of the first packet, $TS_i^0$ represents the unified timestamp of the second packet, $f_{io}$ represents the reference sampling frequency, $TS_i\_SW$ represents the timestamp of the switching point of the second audio stream, $TS_i$ represents the un-unified timestamp of the second packet, ti_pkt represents the packet time of the second audio stream, $dts_i$ represents a theoretical value that is of a timestamp difference between adjacent packets and/or that corresponds to the sampling frequency of the second audio stream, $TS_o\_SW$ represents the timestamp of the switching point of the first audio stream, $TS_o$ represents the un-unified timestamp of the first audio stream, to_pkt represents the packet time of the first audio stream, $dts_o$ represents a theoretical value that is of a timestamp difference between adjacent packets and/or that corresponds to the sampling frequency of the first audio stream, K1 represents first preset duration, and/or K2 represents second preset duration.

In some embodiments, packet time of a to-be-determined audio stream meets the following condition, and/or the to-be-determined audio stream is the first audio stream or the second audio stream:

if $\overline{dTS}_{real} < dTS_{thres}$, the packet time of the to-be-determined audio stream is a first value; or if $\overline{dTS}_{real}\ dTS_{thres}$, the packet time of the to-be-determined audio stream is a second value.

$$\overline{dTS}_{real} = \frac{\sum_{i=1}^{w} dTS_i}{\sum_{i=1}^{w} dSEQ_i}, \overline{dTS}_{real}$$

represents a timestamp increment average determined based on a timestamp increment group of the to-be-determined audio stream, $dTS_{thres}$ is related to theoretical values that are of a timestamp difference between adjacent packets and/or that correspond to different packet time, $dTS_i$ represents an $i^{th}$ timestamp increment in the timestamp increment group of the to-be-determined audio stream, $dSEQ_i$ represents a sequence number difference between two packets corresponding to the $i^{th}$ timestamp increment, and/or w represents a quantity of timestamp increments in the timestamp increment group of the to-be-determined audio stream.

In some embodiments, when determining the sampling frequency of the first audio stream based on the first timestamp increment group, the processing unit is configured to:

perform linear fitting based on the N−1 first timestamp increments, a sequence number difference between two packets corresponding to each first timestamp increment, and/or theoretical values that are of a timestamp difference between adjacent packets and/or that respectively correspond to a plurality of theoretical sampling frequencies supported by the switching device, to obtain a plurality of first fitting errors;

determine a theoretical value that is of a timestamp difference between adjacent packets and/or that corresponds to a minimum first fitting error in the plurality of first fitting errors; and/or use a theoretical sampling frequency corresponding to the theoretical value that is of a timestamp difference between adjacent packets and/or that corresponds to the minimum first fitting error as the sampling frequency of the first audio stream; or when determining the sampling frequency of the second audio stream based on the second timestamp increment group, the processing unit is configured to:

perform linear fitting based on the M−1 second timestamp increments, a timestamp difference between two packets corresponding to each second timestamp increment, and/or theoretical values that are of a timestamp difference between adjacent packets and/or that respectively correspond to a plurality of theoretical sampling frequencies supported by the switching device, to obtain a plurality of second fitting errors;

determine a theoretical value that is of a timestamp difference between adjacent packets and/or that corresponds to a minimum second fitting error in the plurality of second fitting errors; and/or use a theoretical sampling frequency corresponding to the theoretical value that is of a timestamp difference between adjacent packets and/or that corresponds to the minimum second fitting error as the sampling frequency of the second audio stream.

In some embodiments (sometimes referred to as, "a third aspect") the present application further provides an apparatus. The apparatus is applied to a switching device. For beneficial effects, refer to the description in the first aspect. Details are not described herein again. A structure of the communications apparatus includes a processor and/or a transceiver, and/or may include a memory. The processor is configured to support the terminal device in performing the corresponding function in the method according to the first aspect. The memory is coupled to the processor, and/or stores a program instruction and/or data that are necessary for the communications apparatus. The transceiver is configured to communicate with other devices.

In some embodiments (sometimes referred to as, "a fourth aspect") the present application further provides a computer-readable storage medium. The computer-readable storage medium stores an instruction. When the instruction is run on a computer, the computer is enabled to perform the method according to the first aspect.

In some embodiments (sometimes referred to as, "a fifth aspect") the present application further provides a computer program product including an instruction. When the computer program product is run on a computer, the computer is enabled to perform the method according to the first aspect.

In some embodiments (sometimes referred to as, "a sixth aspect") the present application further provides a computer chip. The chip is connected to a memory. The chip is configured to read and/or execute a software program stored in the memory, to perform the method according to the first aspect.

DESCRIPTION OF DRAWINGS

FIG. 6 is a schematic diagram of a switching flow table according to an embodiment of this application;

DESCRIPTION OF EMBODIMENTS

Embodiments of this application may be applied to a scenario in which an audio stream carried on an RTPIP network needs to be switched, such as a master control system, a television studio, or a broadcast domain of a broadcast and television production and broadcasting network.

Figure 1:
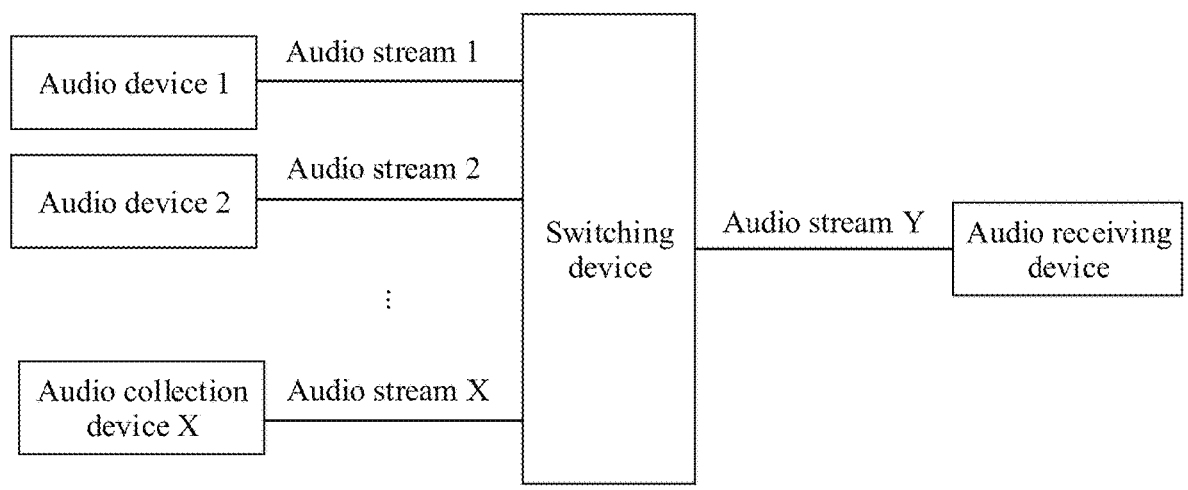
FIG. 1 is a schematic structural diagram of an audio stream switching system according to an embodiment of this application.

FIG. 1 is a schematic structural diagram of an example of an audio stream switching system. The system includes X audio devices, a switching device, and an audio receiving device, and X is an integer greater than 1. The audio device is configured to output an audio stream to the switching device. The switching device is responsible for transmitting one of X audio streams output by the X audio devices to a downstream device, to transmit the audio stream to the audio receiving device by using the downstream device.

The switching device in this embodiment of this application may be an IP network switching device used in a production and broadcasting IP network, such as a router, a switch, or a virtual switch, or may be one or more servers, a virtualization platform, a cloud computing service center, or the like.

For example, the audio stream switching system may include a management device, configured to send (e.g., transmit, provide, deliver) a switching instruction to the switching device. The management device may be connected to the switching device by using a wired network or a wireless network.

In some embodiments, the wireless network or wired network uses a standard communications technology and/or protocol. The network is typically the Internet, but may be any network, including but not limited to any combination of a local area network (local area network, LAN), a metropolitan area network (metropolitan area network, MAN), a wide area network (wide area network, WAN), a mobile, wired, or wireless network, a private network, or a virtual private network.

A pulse code modulation (pulse code modulation, PCM) audio element, transmission restriction, channel requirement, consistency regulation, and the like are normatively described in the Internet protocol (internet protocol, IP) network transmission standard of broadcast and television signals. For example, the Society of Motion Picture and Television Engineers (the society of motion picture and television engineers, SMPTE) 2110 specifies that an audio transmit end and receive end support sampling frequencies of 44.1 kHz, 48 kHz, and 96 kHz, audio duration of 125 μs and 1 ms, and the like.

In an audio data IP process, an audio stream is formed after audio sampling, analog-to-digital conversion, PCM coding, and IP encapsulation are performed successively, and/or is transmitted to a switching device for switching selection. In the entire process, precise time synchronization may be ensured by using a precision time protocol (precision time protocol, PTP) clock source. In a current audio stream switching solution, a to-be-switched-in audio stream needs to be converted into the same audio format as an audio stream being played, and/or switching is performed. As a result, switching efficiency is relatively low and system complexity is relatively high.

Based on this, the embodiments of this application provide an audio stream switching method and apparatus, to resolve a problem of low efficiency and high complexity in the prior art. The method and the apparatus are based on a same inventive concept. The method and the apparatus have similar problem-resolving principles, and therefore mutual reference may be made between apparatus implementation and method implementation, and no repeated description is provided.

Due to different audio device manufacturers, there are different audio sampling frequencies, channel quantities, packet time, and the like. For example, the SMPTE 2110-30 standard specifies three audio sampling frequencies and two types of packet time. Different sampling frequencies and packet time correspond to different audio stream timestamps and packet intervals. Data of a plurality of channels is encapsulated into a same data stream, and therefore a channel quantity does not directly affect audio stream switching. In the embodiments of this application, a timestamp of a packet of an audio stream is obtained to determine a sampling frequency and packet time, and a time relationship between audio streams is obtained to determine a switching point, thereby ensuring correct audio stream switching.

In some embodiments, a stream transmitted before switching may be referred to as a switch-out stream, and a stream transmitted after switching may be referred to as a switch-in stream. In subsequent description of the embodiments of this application, for example, a first audio stream is a switch-out stream, and a second audio stream is a switch-in stream.

Figure 2:
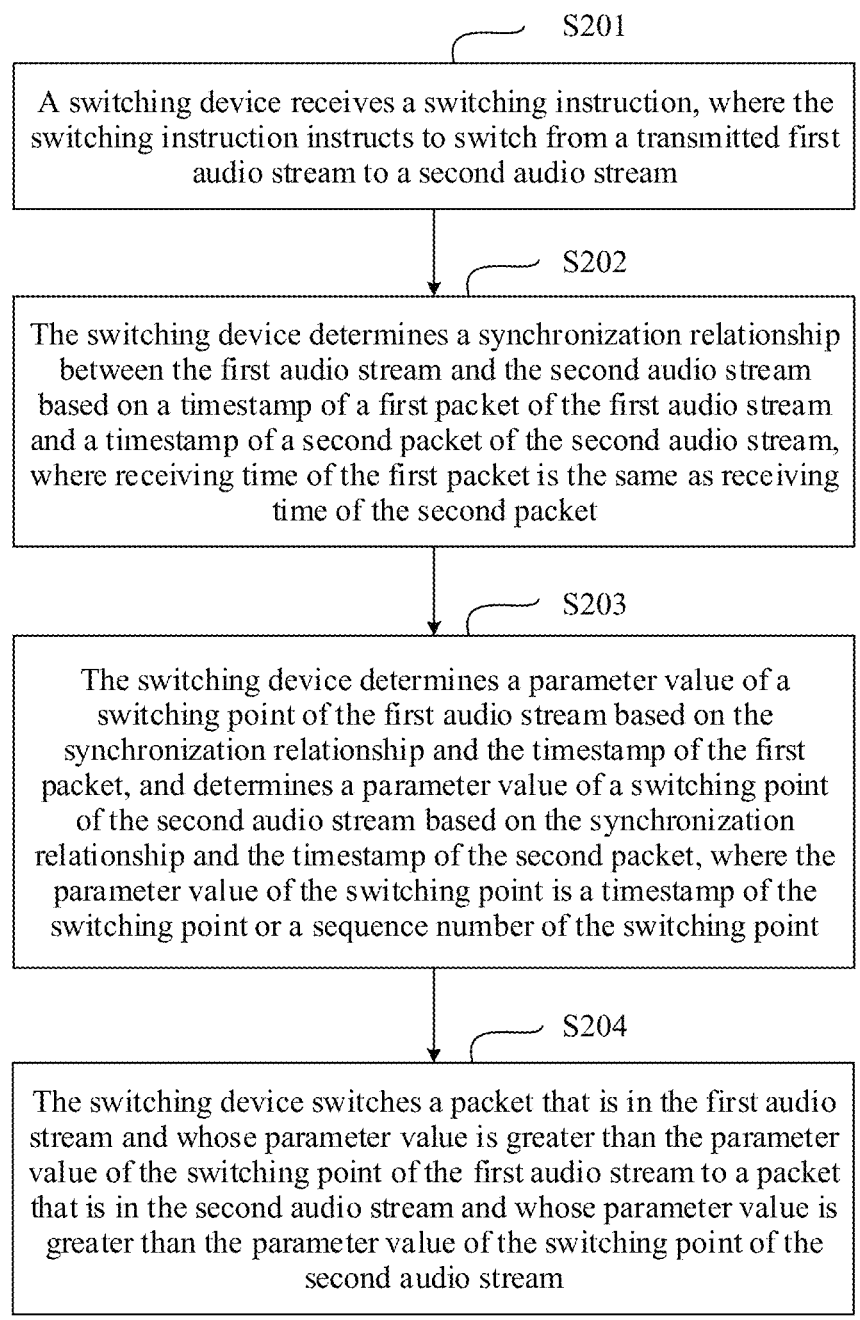
FIG. 2 is a schematic flowchart of an audio stream switching method according to an embodiment of this application.

FIG. 2 is a schematic flowchart of an audio stream switching method according to an embodiment of this application.

S201. A switching device receives a switching instruction, where the switching instruction instructs to switch from a transmitted first audio stream to a second audio stream.

S202. The switching device determines a synchronization relationship between the first audio stream and the second audio stream based on a timestamp of a first packet of the first audio stream and a timestamp of a second packet of the second audio stream, where receiving time of the first packet is the same as receiving time of the second packet.

S203. The switching device determines a parameter value of a switching point of the first audio stream based on the synchronization relationship and the timestamp of the first packet, and determines a parameter value of a switching point of the second audio stream based on the synchronization relationship and the timestamp of the second packet, where the parameter value of the switching point is a timestamp of the switching point or a sequence number of the switching point.

S204. The switching device switches a packet that is in the first audio stream and whose parameter value is greater than the parameter value of the switching point of the first audio stream to a packet that is in the second audio stream and whose parameter value is greater than the parameter value of the switching point of the second audio stream.

In step S204, the switching device switches the packet that is in the first audio stream and whose parameter value is greater than the parameter value of the switching point of the first audio stream to the packet that is in the second audio stream and whose parameter value is greater than the parameter value of the switching point of the second audio stream. To be specific, the switching device discards the packet that is in the first audio stream and whose parameter value is greater than the parameter value of the switching point of the first audio stream, and forwards the packet that is in the second audio stream and whose parameter value is greater than the parameter value of the switching point of the second audio stream. It should be noted that after determining the parameter value of the switching point of the first audio stream, the switching device may receive a packet that is in the first audio stream and whose parameter value is less than or equal to the parameter value of the switching point of the first audio stream. In this case, the switching device may forward the packet that is in the first audio stream and whose parameter value is less than or equal to the parameter value of the switching point of the first audio stream. In some embodiments, the switching device may discard a packet that is received after the parameter value of the switching point of the second audio stream is determined and whose parameter value is less than or equal to the parameter value of the switching point of the second audio stream.

In some embodiments, when the switching device includes at least two output ports, for example, a port 1 and a port 2, before performing switching, the switching device sends the first audio stream and the second audio stream to a monitoring device by using the port 1, and sends the first audio stream to a downstream device by using the port 2. The second audio stream is not forwarded on the port 2, which may be considered as discarding. After performing switching, the switching device still sends the first audio stream and the second audio stream to the monitoring device by using the port 1, and forwards the second audio stream to the downstream device on the port 2. The first audio stream is no longer forwarded to the downstream device, which may be considered that the first audio stream is discarded on the port 2.

In some embodiments, the switching instruction may carry a port number, used to indicate a port for switching an output audio stream.

In some embodiments, the switching device may determine the synchronization relationship between the first audio stream and the second audio stream based on the timestamp of the first packet of the first audio stream and the timestamp of the second packet of the second audio stream in the following manners:

In a first example, when a sampling frequency of the first audio stream is the same as a sampling frequency of the second audio stream, the switching device determines the synchronization relationship between the first audio stream and the second audio stream based on the timestamp of the first packet of the first audio stream and the timestamp of the second packet of the second audio stream.

For example, if an absolute value of a difference between the timestamp of the first packet and the timestamp of the second packet is less than or equal to a first threshold, the first audio stream and the second audio stream are synchronized; otherwise, the first audio stream and the second audio stream are not synchronized. For example, the first threshold is 0 or 2 ms.

In a second example, when a sampling frequency of the first audio stream is different from a sampling frequency of the second audio stream, the switching device unifies the timestamp of the first packet and the timestamp of the second packet based on the sampling frequency of the first audio stream and the sampling frequency of the second audio stream and based on a reference sampling frequency; and the switching device determines the synchronization relationship between the first audio stream and the second audio stream based on a unified timestamp of the first packet and a unified timestamp of the second packet.

For example, if an absolute value of a difference between the unified timestamp of the first packet and the unified timestamp of the second packet is less than or equal to a second threshold, the first audio stream and the second audio stream are synchronized; otherwise, the first audio stream and the second audio stream are not synchronized. For example, the second threshold is 0 or 2 ms.

The sampling frequency of the first audio stream is determined based on timestamps of N received packets in the first audio stream, the sampling frequency of the second audio stream is determined based on timestamps of M received packets in the second audio stream, and both M and N are positive integers. The reference sampling frequency is the sampling frequency of the first audio stream, the sampling frequency of the second audio stream, or a preset sampling frequency.

In some embodiments, the switching device may use the unified timestamp of the first packet as a timestamp of the switching point of the first audio stream, and use the unified timestamp of the second packet as a timestamp of the switching point of the second audio stream. However, because packets may be out of order in a transmission process, if the packets are out of order, some embodiments cannot ensure normal switching and transmission of the packets. A method for caching a received packet based on a packet sequence number is usually used in the prior art. However, in a switching process, operations such as writing, addressing, and reading need to be continuously performed in cache space, which increases system complexity and wastes resources. In this embodiment of this application, packet time may be considered when the parameter value of the switching point of the first audio stream and the parameter value of the switching point of the second audio stream are determined. Duration of several packets is added to the timestamp of the first packet, and an obtained sum is used as the timestamp of the switching point of the first audio stream, and duration of several packets is added to the timestamp of the second packet, and an obtained sum is used as the timestamp of the switching point of the second audio stream, so as to avoid abnormal switching caused by disorder.

Therefore, the switching device may determine the parameter value of the switching point of the first audio stream based on the synchronization relationship and the timestamp of the first packet, and determine the parameter value of the switching point of the second audio stream based on the synchronization relationship and the timestamp of the second packet in the following manner:

The switching device determines the parameter value of the switching point of the first audio stream based on the synchronization relationship, the timestamp of the first packet, and packet time of the first audio stream, and determines the parameter value of the switching point of the second audio stream based on the synchronization relationship, the timestamp of the second packet, and packet time of the second audio stream.

The packet time of the first audio stream is determined based on the timestamps of the N received packets in the first audio stream, and the packet time of the second audio stream is determined based on the timestamps of the M received packets in the second audio stream.

Subsequently, for ease of description, a sampling frequency and packet time are collectively referred to as audio information.

In some embodiments, the sampling frequency and the packet time that are included in audio information of the first audio stream and the sampling frequency and the packet time that are included in audio information of the second audio stream may be determined in the following manners.

Audio information of an audio stream affects switching of the audio stream. Therefore, in this embodiment of this application, a main idea of determining audio information is to sample a packet of an audio stream, and obtain a sampling frequency and packet time in the audio information through statistical learning of a packet timestamp.

For example, Table 1 shows three sampling frequencies of 44.1 kHz, 48 kHz, and 96 kHz, two types of packet time of 125 µs and 1 ms, and theoretical values of a timestamp difference between two packets with adjacent sequence numbers, which are specified in SMPTE 2110.

TABLE 1

| Sequence number | Sampling frequency $f_{sample}$ | Packet time $t_{packet}$ | Theoretical value $\overline{dTS}_{theory}$ of a timestamp difference between two packets with adjacent sequence numbers |
|---|---|---|---|
| 1 | 44.1 kHz | 125 µs | 5.5 |
| 2 | 48 kHz | 125 µs | 6 |
| 3 | 96 kHz | 125 µs | 12 |
| 4 | 44.1 kHz | 1 ms | 44.1 |
| 5 | 48 kHz | 1 ms | 48 |
| 6 | 96 kHz | 1 ms | 96 |

In some embodiments, theoretical values that are of a timestamp difference between two packets with adjacent sequence numbers and that correspond to different sampling frequencies and packet time may be determined by using the following formula (1).

$$\overline{dTS}_{theory} = \frac{f_{sample}}{1s/t_{packet}} \qquad (1)$$

It may be determined from Table 1 and formula (1) that both a sampling frequency and packet time of an audio stream are related to a timestamp difference between adjacent packets. The adjacent packets are two packets with adjacent sequence numbers. Based on this, when determining the sampling frequency and the packet time that are included in the audio information of the first audio stream and the sampling frequency and the packet time that are included in the audio information of the second audio stream, the switching device first obtains a first timestamp increment group of the first audio stream and a second timestamp increment group of the second audio stream.

The first timestamp increment group includes N−1 first timestamp increments determined based on the timestamps of the N received packets in the first audio stream, and the second timestamp increment group includes M−1 second timestamp increments determined based on the timestamps of the M received packets in the second audio stream.

In some embodiments, the switching device determines the sampling frequency and the packet time of the first audio stream based on the first timestamp increment group, and determines the sampling frequency of the second audio stream based on the second timestamp increment group.

A timestamp increment is a timestamp difference between two packets. The timestamp increment may be obtained in a plurality of manners. The following shows two examples.

In some embodiments, a timestamp difference between two consecutively received packets is used as a timestamp increment. To be specific, the first timestamp increment is a timestamp difference between two consecutively received packets in the first audio stream, and the second timestamp increment is a timestamp difference between two consecutively received packets in the second audio stream.

In some embodiments, a plurality of packets are consecutively received, the packets may be sorted based on packet sequence numbers, and/or a timestamp difference between two packets with adjacent sequence numbers is used as a timestamp increment. To be specific, the first timestamp increment is a timestamp difference between two received packets with adjacent sequence numbers in the first audio stream, and the second timestamp increment is a timestamp difference between two received packets with adjacent sequence numbers in the second audio stream.

The following describes a packet time determining manner with reference to a specific scenario:

It may be learned based on the theoretical value of a timestamp difference between two packets with adjacent sequence numbers (which is referred to as a theoretical value in subsequent description) in Table 1 that, when packet time is 125 μs, there are three theoretical values: 5.5, 6, and 12; and when packet time is 1 millisecond (ms), there are three theoretical values: 44.1, 48, and 96. Therefore, it may be learned from Table 1 that the theoretical values respectively corresponding to 125 μs and 1 ms vary obviously. Therefore, a threshold $dTS_{thres}$ may be set, and it may be determined, based on a result of comparing a packet timestamp difference average $\overline{dTS}_{real}$ obtained through calculation and $dTS_{thres}$, that packet time is 125 μs or 1 ms. For example, when $\overline{dTS}_{real} < dTS_{thres}$, packet time of an audio stream is a first value, for example, $t_{packet} = 125$ μs; or when $\overline{dTS}_{real} \geq dTS_{thres}$, packet time of an audio stream is a second value, for example, $t_{packet} = 1$ ms. For example, a value greater than 12 and less than 44.1 may be selected as a value of $dTS_{thres}$. To ensure better determining of packet time, a medium value between 12 and 44.1, for example, 25, may be selected.

A timestamp increment average $\overline{dTS}_{real}$ of a to-be-determined audio stream actually received by a network may be obtained through calculation by using formula (2). The to-be-determined audio stream may be the first audio stream or the second audio stream.

$$\overline{dTS}_{real} = \frac{\sum_{i=1}^{w} dTS_i}{\sum_{i=1}^{w} dSEQ_i} \quad (2)$$

$dTS_i$ represents an $i^{th}$ timestamp increment in a timestamp increment group of the to-be-determined audio stream, $dSEQ_i$ represents a sequence number difference between two packets corresponding to the $i^{th}$ timestamp increment, and w represents a quantity of timestamp increments in the timestamp increment group of the to-be-determined audio stream. For example, when the to-be-determined audio stream is the first audio stream, w=N−1; or when the to-be-determined audio stream is the second audio stream, w=M−1.

In this embodiment of this application, after the first timestamp increment group and the second timestamp increment group are obtained, the sampling frequencies are determined based on the first timestamp increment group and the second timestamp increment group.

For example, the switching device may determine the sampling frequency of the first audio stream based on the first timestamp increment group in the following manner:

performing linear fitting based on the N−1 first timestamp increments, a sequence number difference between two packets corresponding to each first timestamp increment, and theoretical values that are of a timestamp difference between adjacent packets and that respectively correspond to a plurality of theoretical sampling frequencies supported by the switching device, to obtain a plurality of first fitting errors; determining a theoretical value that is of a timestamp difference between adjacent packets and that corresponds to a minimum first fitting error in the plurality of first fitting errors; and using a theoretical sampling frequency corresponding to the theoretical value that is of a timestamp difference between adjacent packets and that corresponds to the minimum first fitting error as the sampling frequency of the first audio stream.

Likewise, the switching device may determine the sampling frequency of the second audio stream based on the second timestamp increment group in the following manner:

performing linear fitting based on the M−1 second timestamp increments, a timestamp difference between two packets corresponding to each second timestamp increment, and theoretical values that are of a timestamp difference between adjacent packets and that respectively correspond to a plurality of theoretical sampling frequencies supported by the switching device, to obtain a plurality of second fitting errors; determining a theoretical value that is of a timestamp difference between adjacent packets and that corresponds to a minimum second fitting error in the plurality of second fitting errors; and using a theoretical sampling frequency corresponding to the theoretical value that is of a timestamp difference between adjacent packets and that corresponds to the minimum second fitting error as the sampling frequency of the second audio stream.

For example, a fitting model may be a linear model: y=kx and k=$\overline{dTS}_{theory}$.

$\overline{dTS}_{theory}$ is a theoretical value in Table 1. For example, when the sampling frequency of the first audio stream is determined, fitting is performed according to a linear equation by using a sequence number difference and a timestamp increment difference ($dSEQ_i$, $dTS_i$) between two received packets, to obtain a fitting error a through calculation.

$$\sigma = \sqrt{\frac{1}{N-1} \sum_{i=1}^{N-1} \left( dTS_i - \overline{dTS}_{(theory,l)} * dSEQ_i \right)^2} \quad (3)$$

$\overline{dTS}_{(theory,l)}$ is the first theoretical value in Table 1, and N−1 is a quantity of first timestamp increments. A ($\sigma$, $\overline{dTS}_{(theory,l)}$) group is obtained by using formula (3), sorting is performed on the fitting error a to obtain a minimum fitting error $\sigma_{min}$ and a corresponding $\overline{dTS}_{theory}$ value, and a sampling frequency $f_{sample}$ is obtained based on $\overline{dTS}_{theory}$. For a correspondence between a sampling frequency and a theoretical value, refer to Table 2.

TABLE 2

| Theoretical average $\overline{dTS}_{theory}$ of timestamp differences between adjacent packets | Sampling frequency $f_{sample}$ |
|---|---|
| $\overline{dTS}_{theory}$ = 5.5 ‖ $\overline{dTS}_{theory}$ = 44.1 | 44.1 kHz |
| $\overline{dTS}_{theory}$ = 6 ‖ $\overline{dTS}_{theory}$ = 48 | 48 kHz |
| $\overline{dTS}_{theory}$ = 12 ‖ $\overline{dTS}_{theory}$ = 96 | 96 kHz |

In some embodiments, in this embodiment of this application, a packet (namely, the N packets or the M packets) for determining audio information of an audio stream may be received before a switching instruction is received, or may be received after the switching instruction is received. The following provides description by using two possible examples.

In an example 1, the N packets are the first N packets in the first audio stream that are received after the switching instruction is received, the M packets are the first M packets in the second audio stream that are received after the switching instruction is received, and N may be equal to M or N may not be equal to M. In this embodiment of this application, in subsequent description, for example, N is equal to M. In the case shown in the example 1, the first packet used to determine the parameter value of the switching point of the first audio stream may be a packet received when the audio information is determined. In some embodiments, another packet may be used, but selecting the packet received when the audio information is determined can reduce a switching latency. The second packet used to determine the parameter value of the switching point of the second audio stream may be a packet that is in the second audio stream and that is received when the audio information is determined. In some embodiments, another packet may be used, but selecting the packet received when the audio information is determined can reduce a switching latency.

In an example 2, the N packets are the N packets in the first audio stream that are received before the switching instruction is received, the M packets are the M packets in the second audio stream that are received before the switching instruction is received, and N may be equal to M or N may not be equal to M.

For example, for the first audio stream, when packets of the first audio stream start to be received, N consecutively received packets are used as packets used to determine the audio information. In a case, in a process of consecutively receiving the N packets used to determine the audio information, no switching instruction is received. In this case, the first packet used to determine the parameter value of the switching point may be the first packet received when the switching instruction is received, or may be another packet, but a switching latency is the smallest when the first packet is selected. In another case, in a process of consecutively receiving the N packets used to determine the audio information, the switching instruction is received, but calculation of the audio information is not affected. In this case, the first packet used to determine the parameter value of the switching point may be a packet received when the audio information is determined, or may be another packet, but a switching latency is the smallest when the packet received when the audio information is determined is selected.

For example, an audio stream meets SMPTE2110 and AES67, a timestamp of a packet of the audio stream is a sample of a real-time transport protocol (real-time transport protocol, RTP) clock, and time corresponding to the timestamp is an offset between a sampling moment and an epoch moment. As shown in formula (4), a timestamp increment per second is a value of an audio sampling frequency:

$$(t - t_{epoch}) * f = TS + m * 2^n \quad (4),$$

where t represents the collection moment of the packet, $t_{epoch}$ is the epoch moment, f is a sampling frequency of the audio stream, m is a quantity of timestamp inverting times, TS represents the timestamp of the packet, and n represents a quantity of bits occupied by the timestamp.

Timestamp inverting means that the timestamp of the packet is inverted when an n-bit timestamp cannot represent the timestamp of the packet. For example, n is 4, and if a timestamp of a previous packet is 1111, a timestamp of a next packet is inverted, and therefore is 0000.

A timestamp in SMPTE 2110 and AES67 usually occupies 32 bits. The timestamp TS is inverted when being recorded using 32 bits, and therefore n=32 in the timestamp calculation formula (4) indicates that 32 is used as an example in subsequent description. The first audio stream used as a switch-out stream and the second audio stream used as a switch-in stream have different sampling frequencies, and therefore have different timestamp calculation references and correspond to different timestamps at a same sampling moment. Therefore, there is a timestamp difference even through the switch-in stream and the switch-out stream are synchronized. Therefore, when the parameter values of the switching points are calculated, the timestamps may be first unified based on the reference sampling frequency. The reference sampling frequency may be the sampling frequency of the switch-in stream or the sampling frequency of the switch-out stream. In some embodiments, the timestamps may be unified based on another sampling frequency of a same standard.

For example, if the timestamp of the switch-out stream is unified based on the sampling frequency of the switch-in stream, the timestamp of the switch-out stream may be unified based on the sampling frequency of the switch-in stream by using the following formula (5).

$$TS\_o\_in\_i = \left( \frac{(TS_o + m * 2^{\wedge}32)}{f_{sample_o}} * f_{sample_i} \right) \bmod(2^{\wedge}32) \quad (5)$$

$f_{sample\_i}$ is the sampling frequency of the switch-in stream, $f_{sample\_o}$ is the sampling frequency of the switch-out stream, TS_o represents the un-unified timestamp of the switch-out stream, and TS_o_in_i represents the unified timestamp of the switch-out stream.

Considering that a timestamp inverting rate is very slow, m may be obtained through calculation based on a current moment, or may be obtained through calculation by using formula (6).

$$m = \frac{(t_{cur} - t_{epoch}) * f_{sample\_i}}{2^{\wedge}32} \quad (6)$$

$t_{cur}$ is the current moment, and $t_{epoch}$ is an epoch moment. Generally, if the epoch moment is 1970-01-01T00:00:00 international atomic time (international atomic time, TAI), the current time may need to be a moment represented by TAI.

The TAI means that according to the fact that some elements have extremely stable atomic energy level transition frequencies, a cesium atom (Cs 132.9)-based energy level transition atomic second is used as a time-scale and is also referred to as a TAI as an international time representation.

In this embodiment of this application, when determining the parameter value of the switching point of the first audio stream and the parameter value of the switching point of the second audio stream, if the sampling frequency of the first audio stream is different from the sampling frequency of the second audio stream, the timestamps are first unified based on the reference sampling frequency according to formula (5) and formula (6). In some embodiments, a synchronization status of the first audio stream and the second audio stream is determined based on the unified timestamps, and/or the parameter value of the switching point of the first audio stream and the parameter value of the switching point of the second audio stream are determined based on the synchronization status.

In an example, non-synchronization duration $t_{nsync}$ is obtained through calculation by using the unified timestamp of the first packet and the unified timestamp of the second packet, and the synchronization status of the first audio stream and the second audio stream may be determined based on the non-synchronization duration.

For example, if the non-synchronization duration is greater than a non-synchronization threshold (threshold1) (the non-synchronization duration is a non-synchronization time difference between the first audio stream and the second audio stream, and the non-synchronization threshold may be determined based on a manually determined empirical value of an audio interval range, for example, a value range of the non-synchronization threshold is 1 to 5 ms), it is determined that the first audio stream and the second audio stream are not synchronized.

For example, non-synchronization duration $t_{nsync}=|TS_o^0-TS_i^0|/f_{io}$, $TS_o^0$ represents the unified timestamp of the first packet in the first audio stream, $TS_i^0$ represents the unified timestamp of the second packet in the second audio stream, $f_{io}$ represents a sampling frequency corresponding to the first timestamp, and K is an integer greater than 1.

In another example, it is determined, based on a difference between the unified timestamp of the first packet and the unified timestamp of the second packet, whether the first audio stream and the second audio stream are synchronized:

If $TS_{nsync}=|TS_o^0-TS_i^0|>$threshold2, it is determined that the first audio stream and the second audio stream are not synchronized; otherwise, it is determined that the first audio stream and the second audio stream are synchronized.

In some embodiments, the parameter value of the switching point of the first audio stream and the parameter value of the switching point of the second audio stream may be determined in a plurality of manners. The following shows three feasible manners.

In a first feasible manner, if the first audio stream and the second audio stream are synchronized, the timestamp of the first packet of the first audio stream may be used as the timestamp of the switching point of the first audio stream, and the timestamp of the second packet of the second audio stream may be used as the timestamp of the switching point of the second audio stream.

In a second feasible manner, if the first audio stream and the second audio stream are synchronized, after a specific latency is added to the timestamp that is of the switching point of the first audio stream and that is determined in the first feasible manner, an obtained sum is used as the timestamp of the switching point, and after the specific latency is added to the timestamp that is of the switching point of the second audio stream and that is determined in the first feasible manner, an obtained sum is used as the timestamp of the switching point.

For example, if it is determined, based on the unified timestamp of the first packet and the unified timestamp of the second packet, that the first audio stream and the second audio stream are synchronized, $TS_i\_SW=TS_i+K1/ti\_pkt*dts_i$ and $TS_o\_SW=TS_o+K1/to\_pkt*dts_o$.

$TS_i\_SW$ represents the timestamp of the switching point of the second audio stream, $TS_i$ represents the un-unified timestamp of the second packet, ti_pkt represents the packet time of the second audio stream, $dts_i$ represents a theoretical value that is of a timestamp difference between adjacent packets and that corresponds to the sampling frequency of the second audio stream, $TS_o\_SW$ represents the timestamp of the switching point of the first audio stream, $TS_o$ represents the un-unified timestamp of the first audio stream, to_pkt represents the packet time of the first audio stream, $dts_o$ represents a theoretical value that is of a timestamp difference between adjacent packets and that corresponds to the sampling frequency of the first audio stream, and K1 is first preset duration.

In a third feasible manner, if the first audio stream and the second audio stream are not synchronized, after a specific latency (for example, the non-synchronization duration) is added for the first audio stream and/or the second audio stream, an obtained sum may be used as a timestamp of a switching point. If the second audio stream is earlier than the first audio stream, a specific latency (for example, the non-synchronization duration) is added for the second audio stream, and an obtained sum is used as the timestamp of the switching point, so that the second audio stream is synchronized with the first audio stream. Considering an out-of-order case, another specific latency may be separately added for the first audio stream and the second audio stream for which the specific latency has been added, and obtained sums are used as the timestamps of the switching points. If the second audio stream is later than the first audio stream, the first audio stream is synchronized with the second audio stream. Considering an out-of-order case, another specific latency may be separately added for the synchronized first audio stream and the second audio stream, and obtained sums are used as the timestamps of the switching points.

For example, if it is determined, based on the unified timestamp of the first packet and the unified timestamp of the second packet, that the first audio stream and the second audio stream are not synchronized, and the unified timestamp of the first packet is later than the unified timestamp of the second packet; in other words, the second audio stream is earlier than the first audio stream, $TS_i\_SW=TS_i+K1/ti\_pkt*dts_i$ and $TS_o\_SW=TS_o+(t_{nsync}+K1)/to\_pkt*dts_o$; or if it is determined, based on the unified timestamp of the first packet and the unified timestamp of the second packet, that the first audio stream and the second audio stream are not synchronized, and the unified timestamp of the first packet is earlier than the unified timestamp of the second packet; in other words, the second audio stream is later than the first audio stream, $TS_i\_SW=TS_i+(t_{nsync}+K2)/ti\_pkt*dts_i$ and $TS_o\_SW=TS_o+K2/to\_pkt*dts_o$. K2 is second preset duration.

In this embodiment of this application, when the parameter value of the switching point of the first audio stream and the parameter value of the switching point of the second audio stream are determined, if the sampling frequency of the first audio stream is the same as the sampling frequency of the second audio stream, the synchronization relationship between the first audio stream and the second audio stream may be directly determined based on the timestamp of the first packet and the timestamp of the second packet, and/or the parameter value of the switching point of the first audio stream and the parameter value of the switching point of the second audio stream may be determined based on the synchronization relationship. The non-synchronization duration is determined in different manners when the sampling frequencies are the same and when the sampling frequencies are different.

For example, the non-synchronization duration $t1_{nsync}=|TS_o-TS_i|/f_{io}$, $TS_o$ represents the timestamp of the first packet, $TS_i$ represents the timestamp of the second packet, and $f_{io}$ represents the sampling frequency of the first audio stream or the sampling frequency of the second audio stream.

The parameter value of the switching point of the first audio stream and the parameter value of the switching point of the second audio stream are determined in similar manners when the sampling frequencies are the same and when the sampling frequencies are different, provided that $t_{nsync}$ is replaced with $t1_{nsync}$, and details are not described repeatedly.

Figure 3:
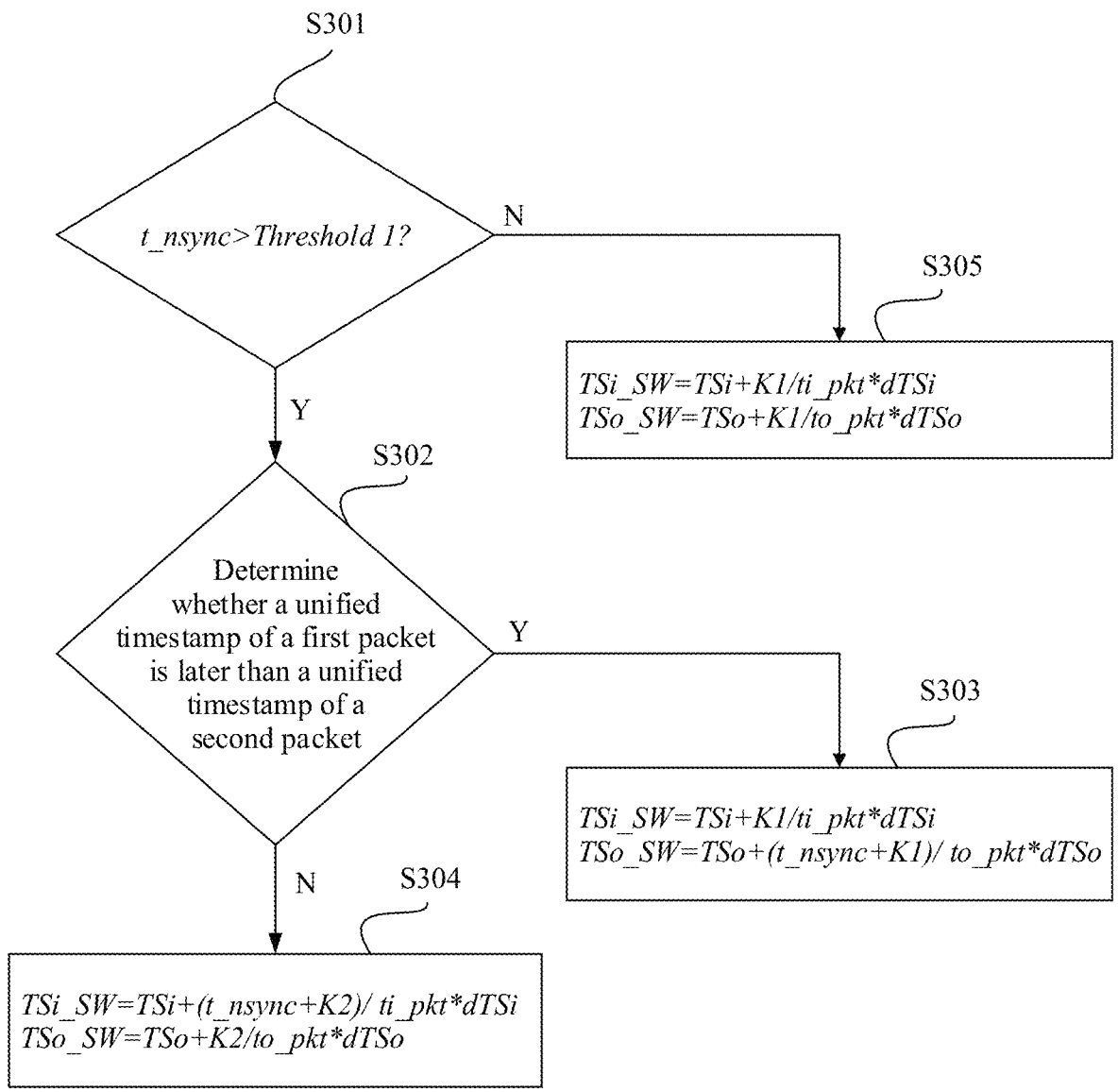
FIG. 3 is a schematic diagram of a process of determining a timestamp of a switching point according to an embodiment of this application.

FIG. 3 is a schematic diagram of an example of a process of determining a switching point timestamp. For example, the sampling frequency of the first audio stream is different from the sampling frequency of the second audio stream, and it is determined, based on the non-synchronization duration, whether the two audio streams are synchronized.

S301. Determine whether $t_{nsync}$>threshold1 is met; and if yes, perform S302; or if no, perform S305.

S302. Determine whether the unified timestamp of the first packet is later than the unified timestamp of the second packet; and if yes, perform S303; or if no, perform S304.

S303. $TS_i\_SW=TS_i+K1/ti\_pkt*dts_i$ and $TS_o\_SW=TS_o+(t_{nsync}+K1)/to\_pkt*dts_o$.

S304. $TS_i\_SW=TS_i+(t_{nsync}+K2)/ti\_pkt*dts_i$ and $TS_o\_SW=TS_o+K2/to\_pkt*dts_o$.

S305. $TS_i\_SW=TS_i+K1/ti\_pkt*dts_i$ and $TS_{oSW}=TS_o+K1/to\_pkt*dts_o$.

For example, when $t_{nsync}$>threshold1, it is determined that the first audio stream and the second audio stream are synchronized; or when $t_{nsync}$≤threshold1, it is determined that the first audio stream and the second audio stream are not synchronized. threshold1 may be 0 or 2 ms.

For example, in this embodiment of this application, another threshold may be configured, and is referred to as a third threshold, and the third threshold may be greater than threshold1. If $t_{nsync}$>third threshold, it is determined that the first audio stream and the second audio stream are not synchronized to an extremely large extent, the timestamp of the switching point of the first audio stream and the timestamp of the switching point of the second audio stream may be determined by using S305.

For example, in this embodiment of this application, the parameter value may be the timestamp of the switching point, or may be the sequence number. Therefore, switching may be performed based on the timestamp of the switching point, or may be performed based on the sequence number of the switching point. After the timestamp of the switching point is determined, the sequence number of the switching point may be determined based on the timestamp of the switching point.

In some embodiments, in step S204 that the switching device switches a packet that is in the first audio stream and whose parameter value is greater than the parameter value of the switching point of the first audio stream to a packet that is in the second audio stream and whose parameter value is greater than the parameter value of the switching point of the second audio stream, for example, the parameter value is the timestamp, and it may be determined, in the following manner, whether a timestamp of a packet in the switch-in stream/switch-out stream is greater than a timestamp of a switching point. After the timestamp of the switching point is obtained through calculation, a timestamp of a current packet of the switch-in stream/switch-out stream is obtained. If the timestamp of the current packet is less than the timestamp of the switching point, there are two possibilities: One possibility is that neither the timestamp of the current packet nor the timestamp of the switching point is inverted, and the current packet does not reach the switching point. The other possibility is that the timestamp of the current packet is inverted and the timestamp of the switching point is not inverted, and the current packet has exceeded the switching point. If the current timestamp is greater than the timestamp of the switching point, there are also two possibilities: One possibility is that neither the timestamp of the current packet nor the timestamp of the switching point is inverted, and the current packet has exceeded the switching point. The other possibility is that the timestamp of the current packet is not inverted and the timestamp of the switching point is inverted, and the current packet does not reach the switching point.

For example, a quantity n=32 of bits occupied by the timestamp is used as an example. If the timestamp of the current packet is greater than the timestamp of the switching point, and a difference between the timestamp of the current packet and the timestamp of the switching point is greater than $2^31$, it is determined that the timestamp of the switching point is inverted and the current timestamp is not inverted. If the timestamp of the current packet is less than the timestamp of the switching point, and a difference between the timestamp of the switching point and the timestamp of the current packet is greater than $2^31$, it is determined that the timestamp of the switching point is not inverted, and the timestamp of the current packet is inverted.

Figure 4A:
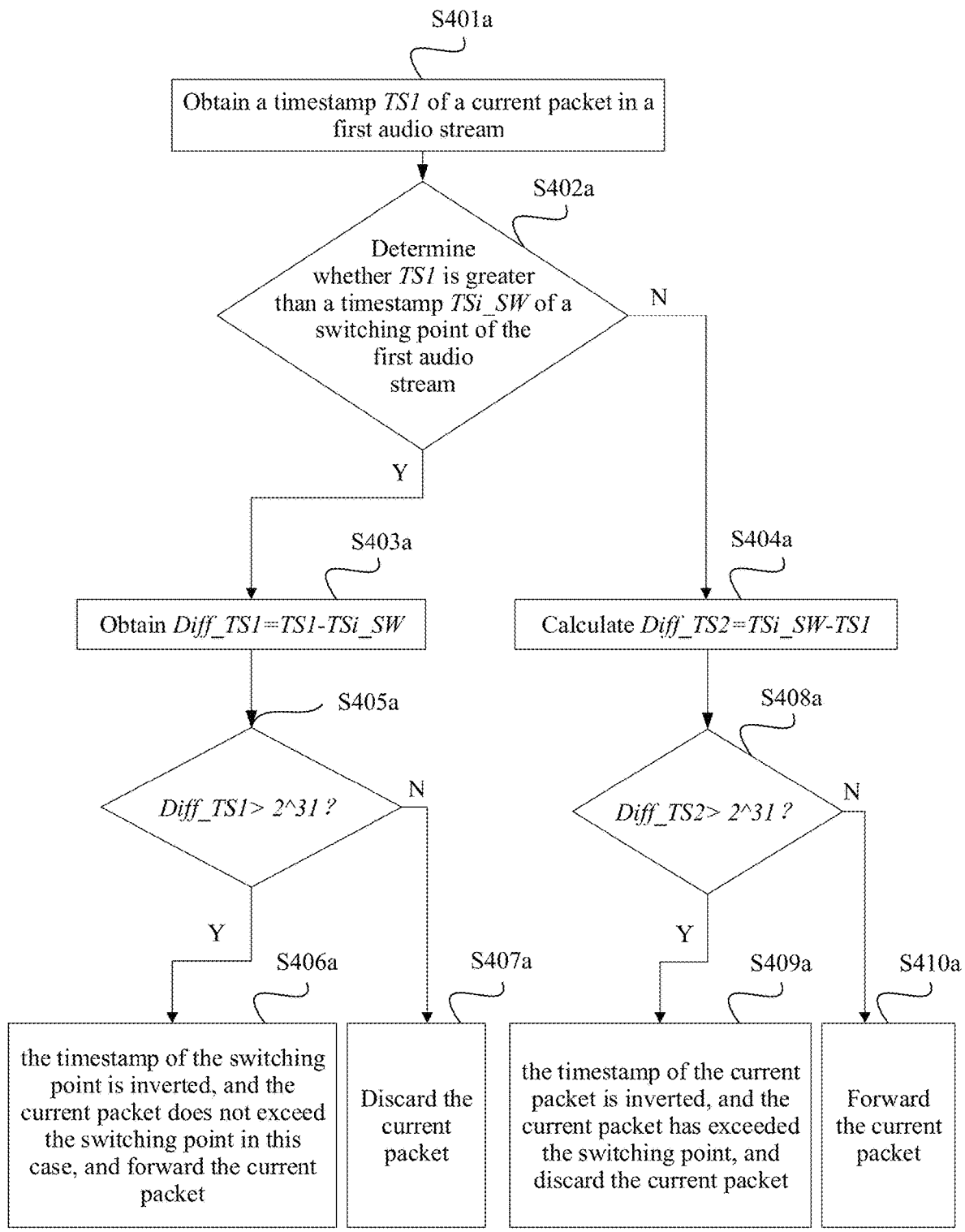
FIG. 4A is a schematic diagram of a method for transmitting a packet in a first audio stream according to an embodiment of this application.
Figure 4B:
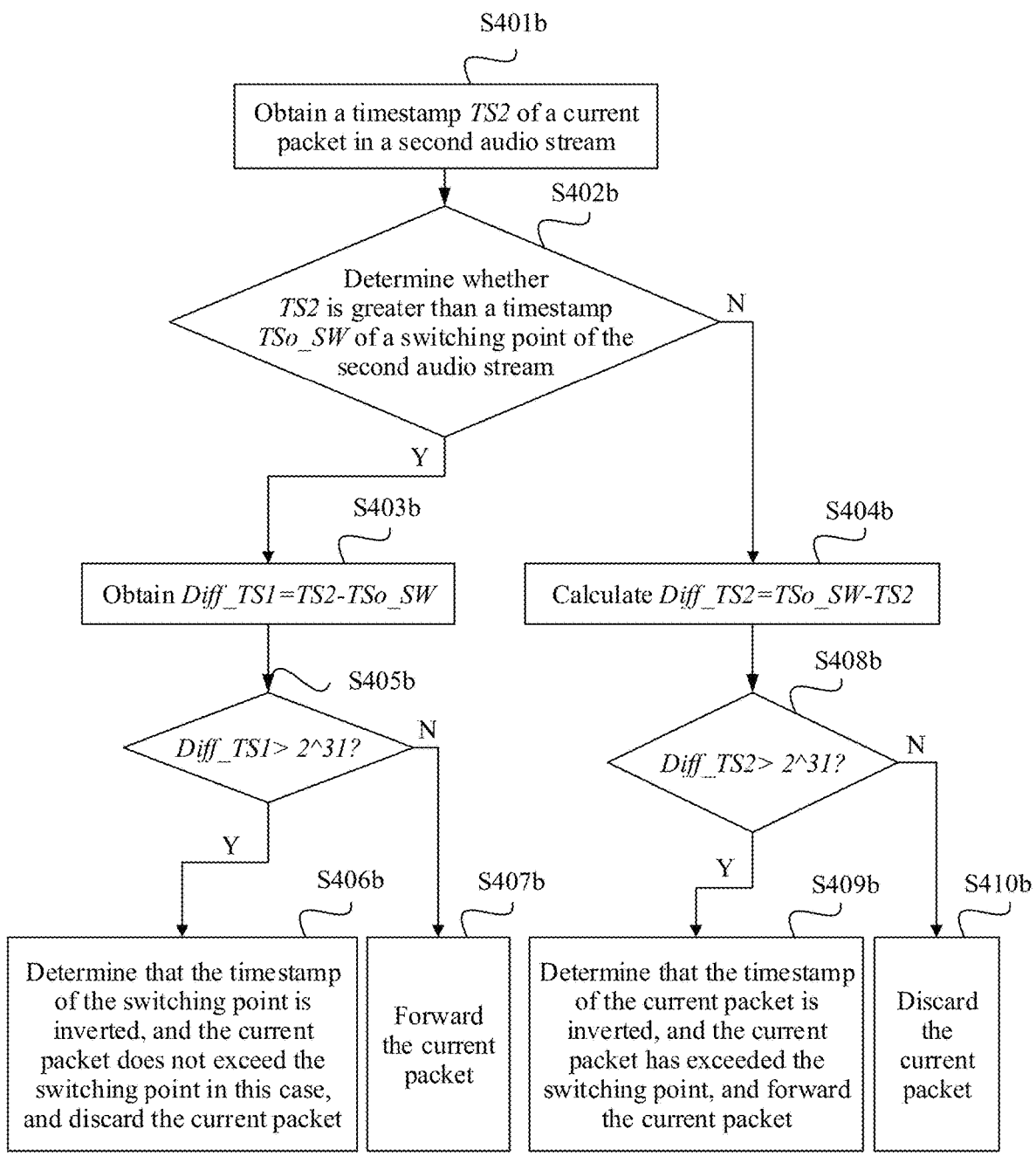
FIG. 4B is a schematic diagram of a method for transmitting a packet in a second audio stream according to an embodiment of this application.

FIG. 4A and FIG. 4B are schematic diagrams of an example of an implementation process in which the switching device switches the packet that is in the first audio stream and whose parameter value is greater than the parameter value of the switching point of the first audio stream to the packet that is in the second audio stream and whose parameter value is greater than the parameter value of the switching point of the second audio stream. For example, the parameter value is the timestamp.

S401a. Obtain a timestamp TS1 of a current packet in the first audio stream.

S402a. Determine whether TS1 is greater than the timestamp $TS_i\_SW$ of the switching point of the first audio stream; and if yes, perform step S403a; or if no, perform step S404a.

S403a. Obtain $Diff\_TS=TS1-TS_i\_SW$.

S405a. Determine whether $Diff\_TS1>2^31$; and if yes, perform S406a; or if no, perform S407a.

S406a. the timestamp of the switching point is inverted, and the current packet does not exceed the switching point in this case, and forward the current packet.

S407a. Discard the current packet.

S404a. Obtain $Diff\_TS2=TS1\_SW-TS_i$.

S408a. Determine whether $Diff\_TS2>2^31$; and if yes, perform S409a; or if no, perform S410a.

S409a. the timestamp of the current packet is inverted, and the current packet has exceeded the switching point, and discard the current packet.

S410a. Forward the current packet.

S401b. Obtain a timestamp TS2 of a current packet in the second audio stream.

S402b. Determine whether TS2 is greater than the timestamp $TS_o\_SW$ of the switching point of the second audio stream; and if yes, perform step S403b; or if no, perform step S404b.

S403b. Obtain $Diff\_TS1=TS2-TS_o\_SW$.

S405b. Determine whether $Diff\_TS1>2^31$; and if yes, perform S406b; or if no, perform S407b.

S406b. Determine that the timestamp of the switching point is inverted, and the current packet does not exceed the switching point in this case, and discard the current packet.

S407b. Forward the current packet.

S404b. Obtain $Diff\_TS2=TS_o\_SW-TS_o$.

S408b. Determine whether $Diff\_TS2>2^31$; and if yes, perform S409b; or if no, perform S410b.

S409b. the timestamp of the current packet is inverted, and the current packet has exceeded the switching point, and forward the current packet.

S410b. Discard the current packet.

The following describes this embodiment of this application in detail with reference to a specific application scenario.

Herein, for example, two to-be-switched audio streams meet the SMPTE 2110 standard, and packets included in the two audio streams are RTP packets.

Figure 5:
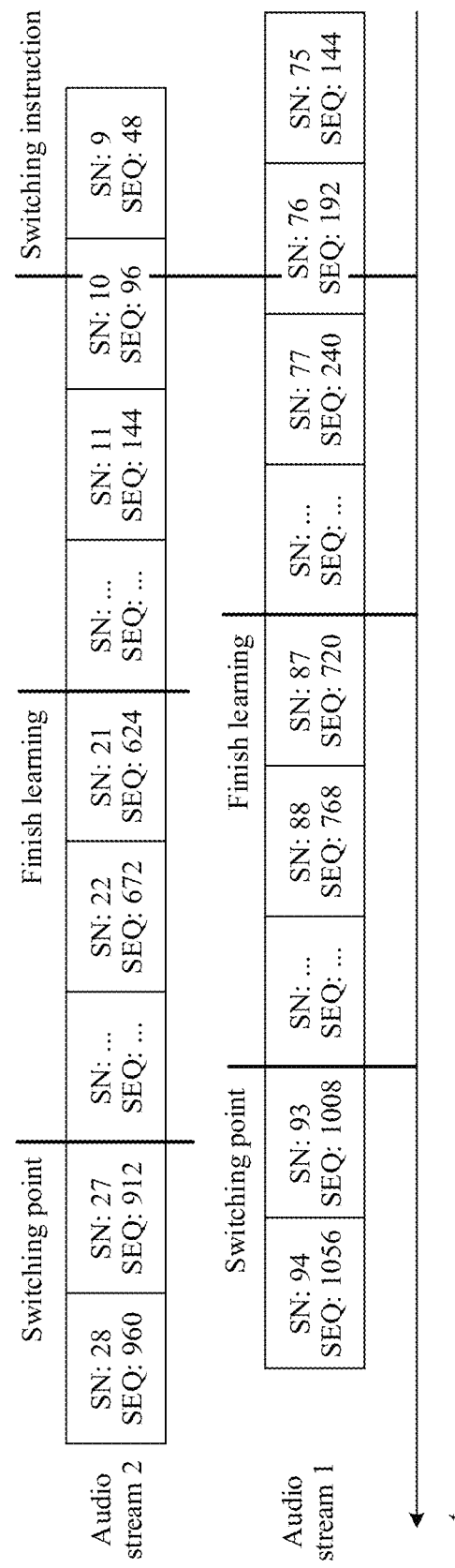
FIG. 5 is a schematic diagram of audio stream switching according to an embodiment of this application.

First, switching between the two audio streams is used as an example. FIG. 5 shows two to-be-switched audio streams. In FIG. 5, for example, audio information of the two audio streams is learned after a switching instruction is received. For a specific audio information learning manner, refer to the description in the embodiment shown in FIG. 2. Details are not described herein again. In FIG. 5, an audio stream 1 is a switch-out stream, and an audio stream 2 is a switch-in stream.

In some embodiments, a switching flow table may be established for each audio stream, to record a switching status, audio information, and the like of the audio stream.

For example, FIG. 6 shows a form of the switching flow table.

In FIG. 6, a stream type (TYPE) represents a state of an audio stream, and there are three states: a normally forwarded stream, a switch-in stream, and a switch-out stream.

A timestamp (TS) represents a timestamp of a current packet in the audio stream, and may be obtained from an RTP.TS.

A sequence number (SN) represents a sequence number of the current packet in the audio stream, and may be obtained from an RTP.SN.

A timestamp difference sum (SUM_DTS) represents a sum of timestamp differences between packets received in an audio information learning process.

A sequence number difference sum (SUM_DSEQ) represents a sum of sequence number differences between packets received in a statistical learning process.

Packet time T_PKT (T_PKT) represents packet time of the audio stream. For example, there are two types of packet time: 125 µs and 1 ms.

A sampling frequency (F_SMPL) represents a sampling frequency of the audio stream. For example, there are three sampling frequencies: 44.1 kHz, 48 kHz, and 96 kHz.

A switching point timestamp TS_SW represents a timestamp of a switching point.

A switching point sequence number (TS_SN) represents a sequence number of the switching point.

A sequence number offset (SN_OFST) represents an RTP sequence number offset value during forwarding of a switch-out stream.

A learning flag (F_LN) represents a flag indicating that audio information of the audio stream starts to be learned.

A learning phase finish flag (F_FL) represents a finish flag of a learning phase of the audio information of the audio stream.

A switching point calculation finish flag (F_FSW) represents a flag indicating that switching point calculation is finished.

Figure 7:
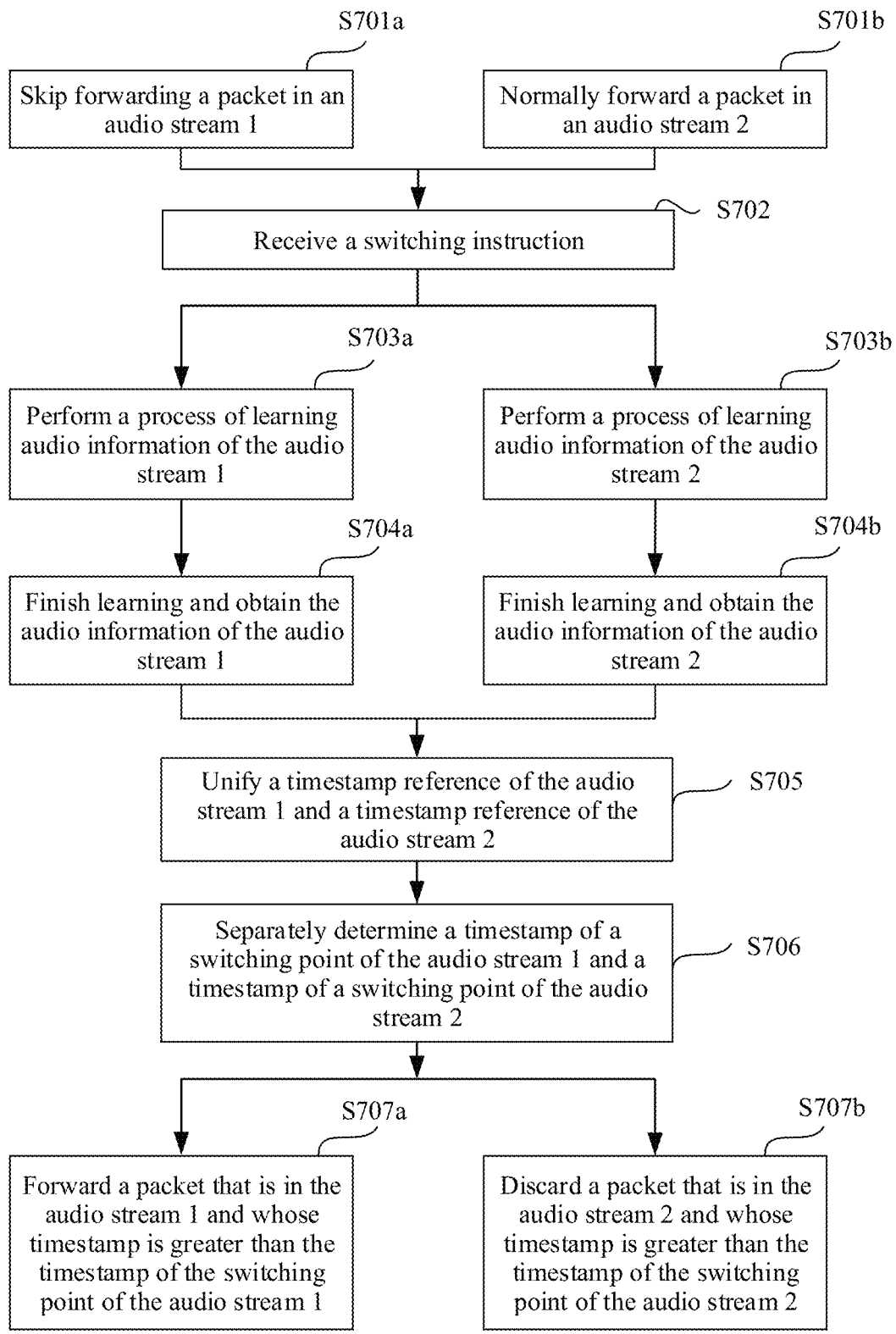
FIG. 7 is a schematic flowchart of another audio stream switching method according to an embodiment of this application.

FIG. 7 is a schematic flowchart of an example of an audio stream switching method.

S701*a*. Skip forwarding a packet in an audio stream 1.
S701*b*. Normally forward a packet in an audio stream 2.
S702. Receive a switching instruction. The switching instruction is used to instruct to switch the audio stream 1 to the audio stream 2.

A stream type in a switching flow table of the audio stream 1 is updated to a switch-out stream, and a stream type in a switching flow table of the audio stream 2 is updated to a switch-in stream.

For example, an audio information learning phase is entered starting from a next packet of a packet at which the switching instruction is received, and learning flag F_LN entries in switching flow tables of the two audio streams may be updated, for example, set to 1.

S703*a*. Perform a process of learning audio information of the audio stream 1. The audio information includes a sampling frequency, and may include packet time. S703*b*. Perform a process of learning audio information of the audio stream 2.

After receiving each packet in the audio stream 1 and the audio stream 2, a difference between a timestamp of the packet and a timestamp TS in a switching flow table and a difference between a sequence number of the packet and a sequence number SN in the switching flow table are calculated, SUM_DTS and SUM_DSEQ in the switching flow table are updated based on the differences, and values of a TS entry and an SN entry in the flow table are updated based on the currently received packet (for the first packet in a learning phase, only the TS entry and the SN entry in the flow table need to be updated, and other operations do not need to be performed).

S704*a*. Finish learning and obtain the audio information of the audio stream 1.
S704*b*. Finish learning and obtain the audio information of the audio stream 2.

After the learning is finished, audio information such as packet time and a sampling frequency of each of the audio stream 1 and the audio stream 2 is obtained based on SUM_DTS and SUM_DSEQ, and the packet time and the sampling frequency are respectively updated to packet time T_PKT and sampling frequency F_SMPL values in a flow table. Learning phase finish flags F_FL in the switching flow tables of the two audio streams may be updated, for example, set to 1.

S705. Unify a timestamp reference of the audio stream 1 and a timestamp reference of the audio stream 2. For example, the first packet whose learning is finished in each of the audio stream 1 and the audio stream 2 is selected to unify the timestamp reference of the audio stream 1 and the timestamp reference of the audio stream 2.

S706. Separately determine a timestamp of a switching point of the audio stream 1 and a timestamp of a switching point of the audio stream 2.

After a learning phase finish flag F_FL is 1, a switching point starts to be calculated. The timestamp reference of the audio stream 1 and the timestamp reference of the audio stream 2 are unified, and a synchronization status is determined. The timestamp and/or a sequence number of the switching point of the audio stream 1, the timestamp and/or a sequence number of the switching point of the audio stream 2, and a sequence number offset of the audio stream 2 are calculated.

Figure 8:
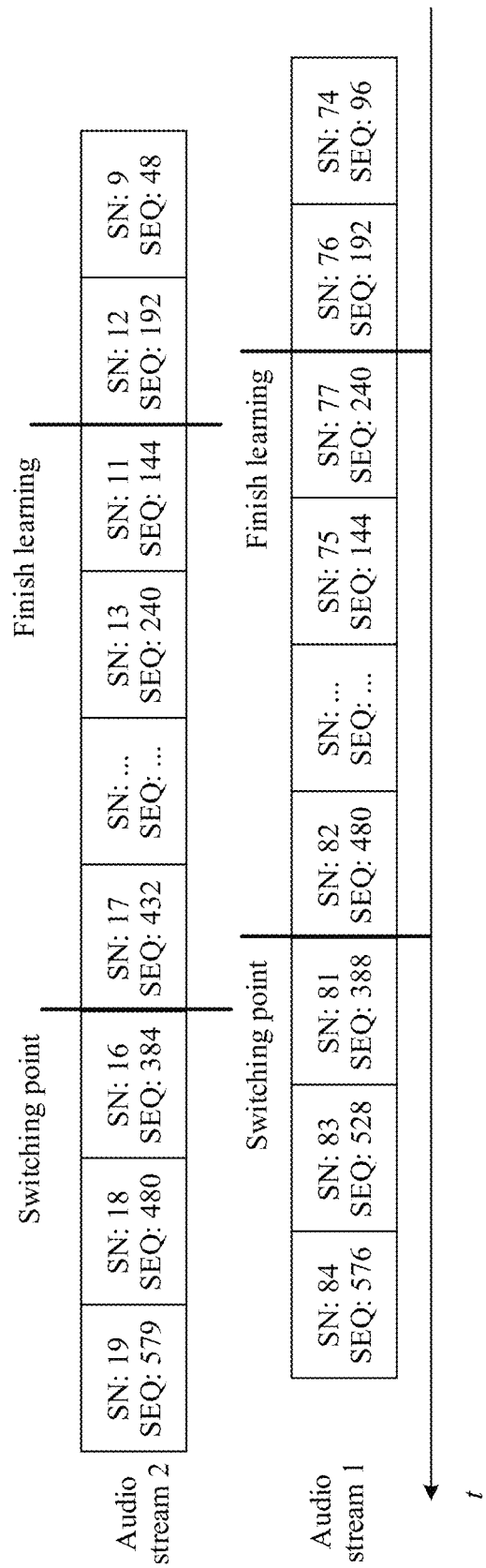
FIG. 8 is a schematic diagram in which sequence numbers of audio streams are out of order according to an embodiment of this application.

For example, as shown in FIG. 8, in consideration of an out-of-order case, in the audio stream 1, receiving time of a packet whose sequence number is 82 is earlier than receiving time of a packet whose sequence number is 81, and in the audio stream 2, receiving time of a packet whose sequence number is 17 is earlier than receiving time of a packet whose sequence number is 16. Therefore, a specific latency is added to a calculated timestamp or sequence number of a switching point, and an obtained timestamp of the switching point of the audio stream 1 is 384, and an obtained sequence number of the switching point of the audio stream 1 is 16. The timestamp of the switching point of the audio stream 2 is 388, and the sequence number of the switching point of the audio stream 2 is 81.

S707a. Discard a packet that is in the audio stream 2 and whose timestamp is greater than the timestamp of the switching point of the audio stream 2.

S707b. Discard a packet that is in the audio stream 1 and whose timestamp is greater than the timestamp of the switching point of the audio stream 1.

After a switching point calculation finish flag is true, it is determined whether a timestamp of a packet in each of the audio stream 1 and the audio stream 2 is greater than a timestamp of a switching point. As shown in FIG. 8, a packet whose timestamp is greater than or equal to 384 in the audio stream 2 is no longer forwarded. A packet whose timestamp is greater than or equal to 388 in the audio stream 1 is forwarded. To be specific, in the audio stream 2, although receiving time of a packet whose timestamp is 432 is earlier than receiving time of a packet whose timestamp is 384, the packet whose timestamp is 432 is no longer forwarded; and in the audio stream 1, although receiving time of a packet whose timestamp is 480 is earlier than receiving time of a packet whose timestamp is 388, the packet whose timestamp is 480 needs to be forwarded.

In some embodiments, when a packet in the audio stream 1 (the switch-in stream) is forwarded, destination IP and a destination port are modified. To ensure continuity of RTP sequence numbers in the switching process, the sequence number of the forwarded packet in the audio stream 1 (the switch-in stream) may be modified based on a sequence number offset value of the audio stream 1 and the sequence number offset value of the audio stream 2.

Figure 9:
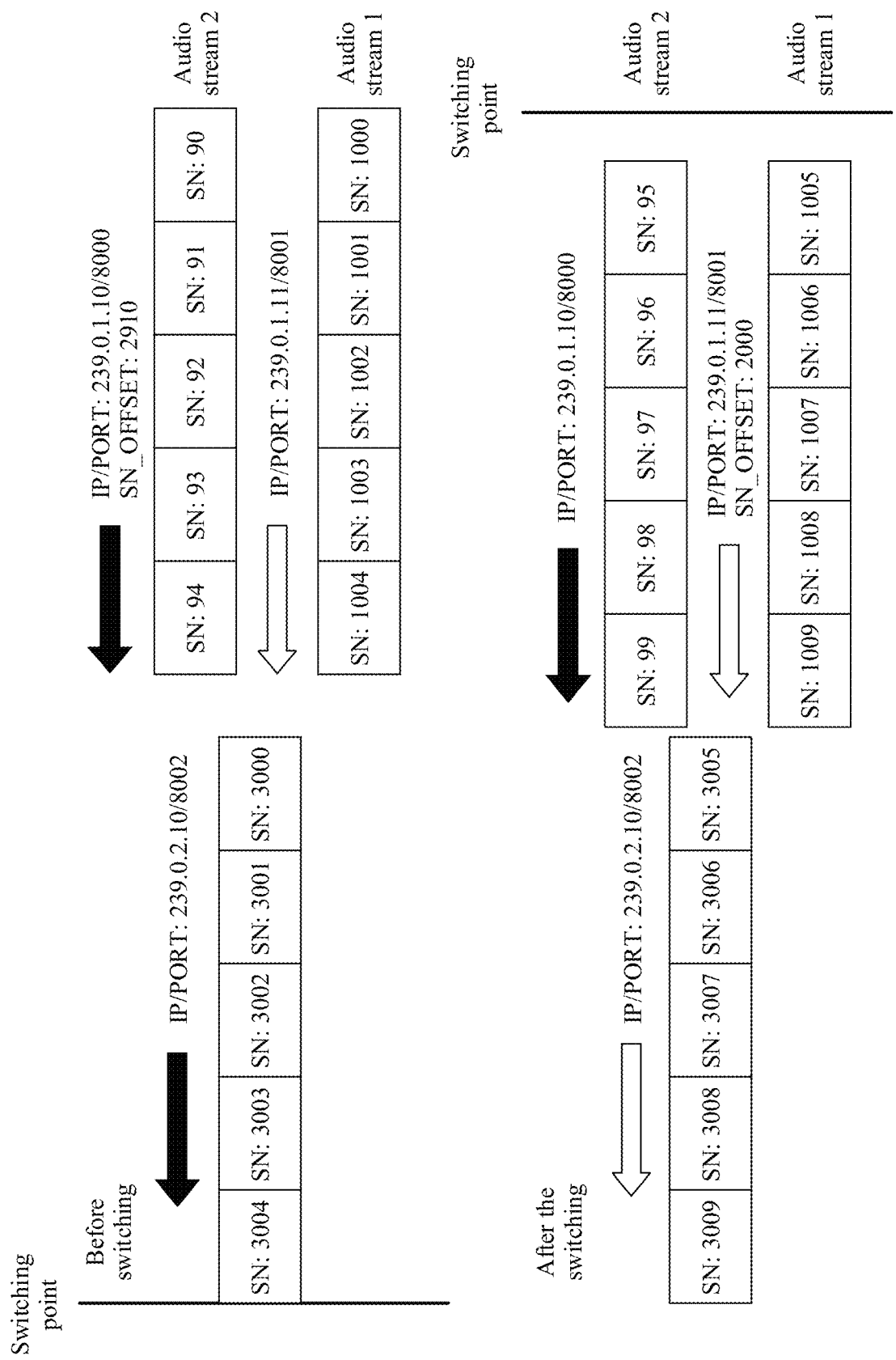
FIG. 9 is a schematic diagram of sequence number updating according to an embodiment of this application.

For example, as shown in FIG. 9, before switching, it is determined, based on the sequence number offset value of the audio stream 2, that sequence numbers 90 to 94 in the audio stream 2 should be sequence numbers 3000 to 3004 through calculation. After the switching, sequence numbers should start from 3005. Sequence numbers of packets in the audio stream 1 start from 1005 when the switching starts, so that it is determined that the sequence number offset value of the audio stream 1 is 2000, and the sequence number offset value 2000 is added to each sequence number through calculation.

In some embodiments, after preset duration expires after the switching between the audio stream 1 and the audio stream 2 starts, the audio stream 1 and the audio stream 2 enter a stable state, and when the switching is finished, stream types in the switching flow tables of the audio stream 1 and the audio stream 2 may be updated. In some embodiments, other fields different from the stream types and the sequence number offsets in the switching flow tables may be reset.

Figure 10:
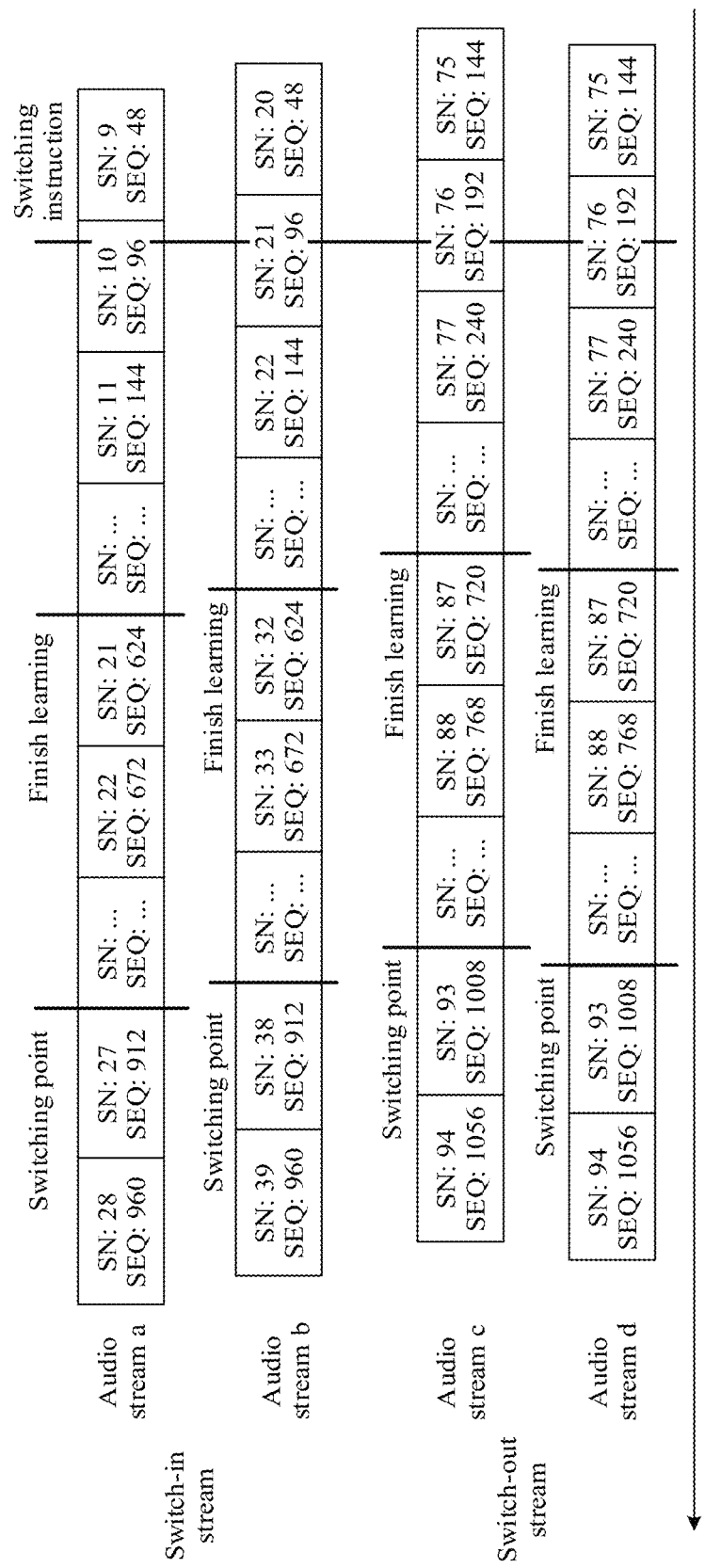
FIG. 10 is a schematic diagram of switching between a plurality of audio streams according to an embodiment of this application.

In some embodiments, Y audio streams may be switched to another Y audio streams, and Y is a positive integer greater than or equal to 2. For example, referring to FIG. 10, two audio streams are switched to another two audio streams. A difference between switching between a plurality of audio streams and switching between two audio streams lies in that, in a switching process, before a timestamp and/or a sequence number of a switching point are/is calculated, timestamps of two audio streams included in a switch-in stream and timestamps of two audio streams included in a switch-out stream are first unified based on a same timestamp reference, and timestamps that are of the four audio streams and that are obtained after being unified based on the reference are compared, to determine an audio stream with an earlier timestamp in the two audio streams included in the switch-in stream, and an audio stream with an earlier timestamp in the two audio streams included in the switch-out stream. A timestamp of the switch-in stream is determined based on the audio stream with the earlier timestamp in the switch-in stream, and a timestamp of the switch-out stream is determined based on the audio stream with the earlier timestamp in the switch-out stream. For example, as shown in FIG. 10, the switch-in stream includes an audio stream a and an audio stream b, and the switch-out stream includes an audio stream c and an audio stream d. It can be seen from FIG. 10 that, the audio stream b is earlier than the audio stream a in the switch-in stream, and the audio stream c is earlier than the audio stream d in the switch-out stream. Timestamps and/or sequence numbers of switching points of the switch-in stream and the switch-out stream may be separately determined based on timestamps of the audio stream b and the audio stream c. For a specific determining manner, refer to the descriptions in the embodiments shown in FIG. 2 and FIG. 7. Details are not described herein again.

Figure 11:
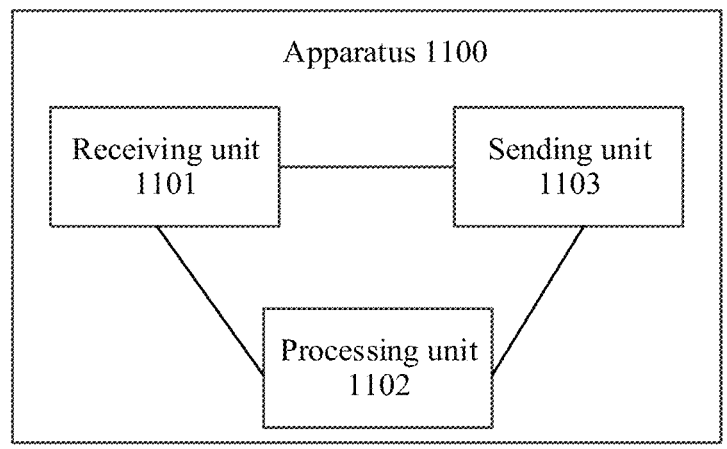
FIG. 11 is a schematic structural diagram of an apparatus 1100 according to an embodiment of this application.

Based on the same inventive concept as the foregoing method embodiment, as shown in FIG. 11, an embodiment of this application provides an apparatus. The apparatus may include a receiving unit 1101, a processing unit 1102, and a sending unit 1103.

In some embodiments, the apparatus implements a function of the switching device in the foregoing method. The apparatus may be a switching device, or may be one or more processors in the switching device, or one or more chips. In some embodiments, the receiving unit 1101, the processing unit 1102, and the sending unit 1103 may execute corresponding functions executed by the switching device in any of the foregoing method embodiments. Details are not described herein.

In this embodiment of this application, unit division is an example, and is merely logical function division. In actual implementation, there may be another division manner. In some embodiments, function units in this embodiment of this application may be integrated into one processor, or may exist alone physically, or two or more units may be integrated into one unit. The integrated unit may be implemented in a form of hardware, or may be implemented in a form of a software function unit.

Figure 12:
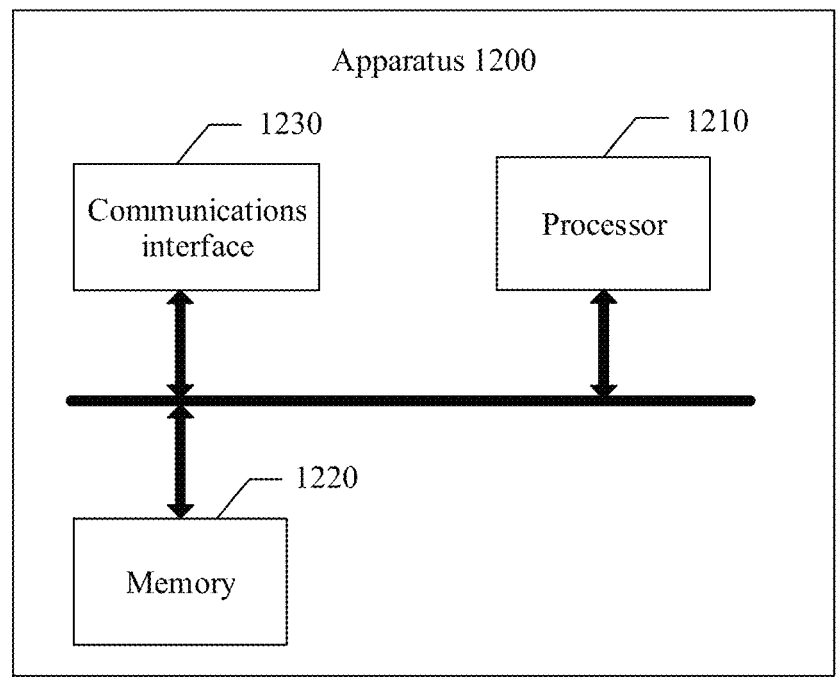
FIG. 12 is a schematic structural diagram of an apparatus 1200 according to an embodiment of this application.

Based on the same concept, as shown in FIG. 12, this application provides an apparatus 1200. The apparatus 1200 includes at least one processor 1210. The apparatus may include at least one memory 1220, configured to store a program instruction and/or data. The memory 1220 is coupled to the processor 1210. Couplings in this embodiment of this application are indirect couplings or communication connections between apparatuses, units, or modules, may be implemented in electrical, mechanical, or other forms, and are used for information exchange between the apparatuses, the units, or the modules. The processor 1210 may perform a cooperative operation with the memory 1220. The processor 1210 may execute the program instruction stored in the memory 1220, so that the processor 1210 invokes the program instruction to implement a function of the processor 1210. In some embodiments, at least one of the at least one memory 1220 may be included in the processor 1210. The apparatus 1200 may include a communications interface 1230. The apparatus 1200 may exchange information with another device by using the communications interface 1230. The communications interface 1230 may be a circuit, a bus, a transceiver, or any other apparatus that can be configured to exchange information.

The apparatus 1200 is applied to a switching device. In some embodiments, the apparatus 1200 may be a switching device, or may be an apparatus that can support a switching device in implementing the function of the switching device in the method according to any of the foregoing embodiments. For example, the at least one processor 1210 in the apparatus 1200 is configured to implement the function of the switching device in the method according to any of the foregoing embodiments.

For example, the apparatus 1200 may be a chip or a chip system. In some embodiments, in this embodiment of this application, the chip system may include a chip, or may include a chip and another discrete device.

In this embodiment of this application, a specific connection medium between the communications interface 1230, the processor 1210, and the memory 1220 is not limited. In this embodiment of this application, the memory 1220, the processor 1210, and the communications interface 1230 are connected by using a bus in FIG. 12. In FIG. 12, the bus is indicated by using a bold line. A manner of connection between other components is merely an example for description, and imposes no limitation. The bus may be classified as an address bus, a data bus, a control bus, or the like. For ease of representation, only one bold line is used to represent the bus in FIG. 12, but this does not mean that there is only one bus or only one type of bus.

In this embodiment of this application, the processor may be a general purpose processor, a digital signal processor, an application-specific integrated circuit, a field programmable gate array or another programmable logic device, a discrete gate or transistor logic device, or a discrete hardware component, and may implement or execute the methods, steps, operations, and logical block diagrams disclosed in the embodiments of this application. The general purpose processor may be a microprocessor, any conventional processor, or the like. The operations of the methods disclosed with reference to the embodiments of this application may be directly performed by a hardware processor, or may be performed by using a combination of hardware in the processor and a software module.

In this embodiment of this application, the memory may be a nonvolatile memory such as a hard disk drive (hard disk drive, HDD) or a solid state drive (solid-state drive, SSD), or may be a volatile memory (volatile memory) such as a random-access memory (random-access memory, RAM). In some embodiments, the memory may be any other medium that can be configured to carry or store expected program code in a form of an instruction or a data structure and that is accessible to a computer, but is not limited thereto. In some embodiments, the memory in this embodiment of this application may be a circuit or any other apparatus that can implement a storage function, and is configured to store a program instruction and/or data.

Based on the foregoing embodiments, an embodiment of this application provides a computer storage medium. The storage medium stores a software program, and when being read and executed by one or more processors, the software program can implement the method according to any one or more of the foregoing embodiments. The computer storage medium may include any medium that can store program code, such as a universal serial bus (USB) flash drive, a removable hard disk, a read-only memory, a random access memory, a magnetic disk, or an optical disc.

Based on the foregoing embodiments, an embodiment of this application provides a chip. The chip includes a processor, configured to implement the function in any one or more of the foregoing embodiments, for example, obtain or process information or a message in the foregoing method. In some embodiments, the chip includes a memory, and the memory is configured to store a program instruction and data that are necessary for the processor to execute the function. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. The embodiments disclosed in the present application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and/or steps are performed on the computer or another programmable device, thereby generating computer-implemented processing. Therefore, the instructions executed on the computer or another programmable device provide operations for implementing a specific function in one or more processes in the flowcharts and/or in one or more blocks in the block diagrams.

It is clear that a person skilled in the art can make various modifications and variations to this application without departing from the scope of this application. In this way, this application is intended to cover these modifications and variations of this application provided that they fall within the scope of the claims of this application and their equivalent technologies.

What is claimed is:

1. An audio stream switching method, comprising:
receiving, by a switching device, a switching instruction, wherein the switching instruction instructs to switch from a transmitted first audio stream to a second audio stream;
determining, by the switching device, a synchronization relationship between the first audio stream and the second audio stream based on a timestamp of a first packet of the first audio stream and a timestamp of a second packet of the second audio stream, wherein a receiving time of the first packet is the same as a receiving time of the second packet, the determining, by the switching device, the synchronization relationship between the first audio stream and the second audio stream comprising:
when a sampling frequency of the first audio stream is different from a sampling frequency of the second audio stream, unifying, by the switching device, the timestamp of the first packet and the timestamp of the second packet based on the sampling frequency of the first audio stream and the sampling frequency of the second audio stream and based on a reference sampling frequency; and
determining, by the switching device, the synchronization relationship between the first audio stream and the second audio stream based on a unified timestamp of the first packet and a unified timestamp of the second packet, wherein
the sampling frequency of the first audio stream is determined based on timestamps of N received packets in the first audio stream, the sampling frequency of the second audio stream is determined based on timestamps of M received packets in the second audio stream, both M and N are positive integers greater than one, and the reference sampling frequency is the sampling frequency of the first audio stream, the sampling frequency of the second audio stream, or a preset sampling frequency;
determining, by the switching device, a parameter value of a switching point of the first audio stream based on the synchronization relationship and the timestamp of the first packet;
determining, by the switching device, a parameter value of a switching point of the second audio stream based on the synchronization relationship and the timestamp of the second packet, wherein the parameter value of the switching point is a timestamp of the switching point or a sequence number of the switching point; and
switching, by the switching device, a packet that is in the first audio stream and whose parameter value is greater than the parameter value of the switching point of the first audio stream to a packet that is in the second audio stream and whose parameter value is greater than the parameter value of the switching point of the second audio stream.

2. The method according to claim 1, further comprising:
obtaining, by the switching device, a first timestamp increment group of the first audio stream and a second timestamp increment group of the second audio stream, wherein
the first timestamp increment group comprises N−1 first timestamp increments determined based on the timestamps of the N packets, and the second timestamp increment group comprises M−1 second timestamp increments determined based on the timestamps of the M received packets;
a first timestamp increment is a timestamp difference between two consecutively received packets in the first audio stream, and the second timestamp increment is a timestamp difference between two consecutively received packets in the second audio stream; or the first timestamp increment is a timestamp difference between received adjacent packets in the first audio stream, and the second timestamp increment is a timestamp difference between received adjacent packets in the second audio stream; and determining, by the switching device, the sampling frequency of the first audio stream based on the first timestamp increment group, and
determining, by the switching device, the sampling frequency of the second audio stream based on the second timestamp increment group.

3. The method according to claim 2, wherein the N packets are first N packets in the first audio stream that are received after the switching instruction is received, the M packets are first M packets in the second audio stream that are received after the switching instruction is received, and N is equal to M.

4. The method according to claim 3, wherein the first packet is a packet that is in the first audio stream and that is received when the sampling frequency of the first audio stream is determined, and the second packet is a packet that is in the second audio stream and that is received when audio information of the second audio stream is determined.

5. The method according to claim 2, wherein the determining, by the switching device, the sampling frequency of the first audio stream based on the first timestamp increment group comprises:
performing linear fitting based on the N−1 first timestamp increments, a sequence number difference between two packets corresponding to each first timestamp increment, and theoretical values that are of a timestamp difference between adjacent packets and that respectively correspond to a plurality of theoretical sampling frequencies supported by the switching device, to obtain a plurality of first fitting errors;
determining a theoretical value that is of a timestamp difference between adjacent packets and that corresponds to a minimum first fitting error in the plurality of first fitting errors; and
using a theoretical sampling frequency corresponding to the theoretical value that is of a timestamp difference between adjacent packets and that corresponds to the minimum first fitting error as the sampling frequency of the first audio stream; or
the determining, by the switching device, the sampling frequency of the second audio stream based on the second timestamp increment group comprises:
performing linear fitting based on the M−1 second timestamp increments, a timestamp difference between two packets corresponding to each second timestamp increment, and theoretical values that are of a timestamp difference between adjacent packets and that respectively correspond to a plurality of theoretical sampling frequencies supported by the switching device, to obtain a plurality of second fitting errors;
determining a theoretical value that is of a timestamp difference between adjacent packets and that corresponds to a minimum second fitting error in the plurality of second fitting errors; and
using a theoretical sampling frequency corresponding to the theoretical value that is of a timestamp difference between adjacent packets and that corresponds to the minimum second fitting error as the sampling frequency of the second audio stream.

6. The method according to claim 1, wherein the determining,
by the switching device, a parameter value of a switching point of the first audio stream based on the synchronization relationship and the timestamp of the first packet, and determining a parameter value of a switching point of the second audio stream based on the synchronization relationship and the timestamp of the second packet comprises:
determining, by the switching device, the parameter value of the switching point of the first audio stream based on the synchronization relationship, the timestamp of the first packet, and packet time of the first audio stream, and
determining, by the switching device, the parameter value of the switching point of the second audio stream based on the synchronization relationship, the timestamp of the second packet, and packet time of the second audio stream, wherein
the packet time of the first audio stream is determined based on the timestamps of the N packets, and the packet time of the second audio stream is determined based on the timestamps of the M packets.

7. The method according to claim 6, wherein a packet timestamp of the switching point of the first audio stream and a packet timestamp of the switching point of the second audio stream meet following condition:
if it is determined, based on the unified timestamp of the first packet and the unified timestamp of the second packet, that the first audio stream and the second audio stream are synchronized, $TS_i\_SW=TS_i+K1/ti\_pkt*dts_i$ and $TS_o\_SW=TS_o+K1/to\_pkt*dts_o$; or
if the unified timestamp of the first packet is later than the unified timestamp of the second packet, $TS_i\_SW=TS_i+K1/ti\_pkt*dts_i$ and $TS_o\_SW=TS_o+(t_{nsync}+K1)/to\_pkt*dts_o$; or
if the unified timestamp of the first packet is earlier than the unified timestamp of the second packet, $TS_i\_SW=TS_i+(t_{nsync}+K2)/ti\_pkt*dts_i$ and $TS_o\_SW=TS_o+K2/to\_pkt*dts_o$, wherein
$t_{nsync}=|TS_o^0-TS_i^0|/f_{io}$, $TS_o^0$ represents the unified timestamp of the first packet, $TS_i^0$ represents the unified timestamp of the second packet, $f_{io}$ represents the reference sampling frequency, $TS_i\_SW$ represents the timestamp of the switching point of the second audio stream, $TS_i$ represents the un-unified timestamp of the second packet, ti_pkt represents the packet time of the second audio stream, $dts_i$ represents a theoretical value that is of a timestamp difference between adjacent packets and that corresponds to the sampling frequency of the second audio stream, $TS_o\_SW$ represents the timestamp of the switching point of the first audio stream, $TS_o$ represents the un-unified timestamp of the first audio stream, to_pkt represents the packet time of the first audio stream, $dts_o$ represents a theoretical value that is of a timestamp difference between adjacent packets and that corresponds to the sampling frequency of the first audio stream, K1 represents first preset duration, and K2 represents second preset duration.

8. The method according to claim 6, wherein packet time of a to-be-determined audio stream meets the following condition, and the to-be-determined audio stream is the first audio stream or the second audio stream:
if $\overline{dTS}_{real} < dTS_{thres}$, the packet time of the to-be-determined audio stream is a first value; or
if $\overline{dTS}_{real} \geq dTS_{thres}$, the packet time of the to-be-determined audio stream is a second value, wherein $$\overline{dTS}_{real} = \frac{\sum_{i=1}^{w} dTS_i}{\sum_{i=1}^{w} dSEQ_i}, \overline{dTS}_{real}$$

represents a timestamp increment average determined based on a timestamp increment group of the to-be-determined audio stream, $dTS_{thres}$ is related to theoretical values that are of a timestamp difference between adjacent packets and that correspond to different packet time, $dTS_i$ represents an $i^{th}$ timestamp increment in the timestamp increment group of the to-be-determined audio stream, $dSEQ_i$ represents a sequence number difference between two packets corresponding to the $i^{th}$ timestamp increment, and w represents a quantity of timestamp increments in the timestamp increment group of the to-be-determined audio stream.

9. A audio stream switching device comprising:
at least one processor;
one or more memories coupled to the at least one processor and storing instructions for execution by the at least one processor, the instructions instruct the at least one processor to:
receive a switching instruction, wherein the switching instruction instructs to switch from a transmitted first audio stream to a second audio stream;
determine a synchronization relationship between the first audio stream and the second audio stream based on a timestamp of a first packet of the first audio stream and a timestamp of a second packet of the second audio stream, wherein a receiving time of the first packet is the same as a receiving time of the second packet, and the instructions instruct the at least one processor to:
when a sampling frequency of the first audio stream is different from a sampling frequency of the second audio stream, unify the timestamp of the first packet and the timestamp of the second packet based on the sampling frequency of the first audio stream and the sampling frequency of the second audio stream and based on a reference sampling frequency; and
determine the synchronization relationship between the first audio stream and the second audio stream based on a unified timestamp of the first packet and a unified timestamp of the second packet, wherein
the sampling frequency of the first audio stream is determined based on timestamps of N received packets in the first audio stream, the sampling frequency of the second audio stream is determined based on timestamps of M received packets in the second audio stream, both M and N are positive integers greater than one, and the reference sampling frequency is the sampling frequency of the first audio stream, the sampling frequency of the second audio stream, or a preset sampling frequency;
determine a parameter value of a switching point of the first audio stream based on the synchronization relationship and the timestamp of the first packet,
determine a parameter value of a switching point of the second audio stream based on the synchronization relationship and the timestamp of the second packet, wherein the parameter value of the switching point is a timestamp of the switching point or a sequence number of the switching point; and
switch a packet that is in the first audio stream and whose parameter value is greater than the parameter value of the switching point of the first audio stream to a packet that is in the second audio stream and whose parameter value is greater than the parameter value of the switching point of the second audio stream.

10. The device according to claim 9, wherein the instructions further instruct the at least one processor to:
   obtain a first timestamp increment group of the first audio stream and a second timestamp increment group of the second audio stream, wherein
   the first timestamp increment group comprises N−1 first timestamp increments determined based on the timestamps of the N packets, and the second timestamp increment group comprises M−1 second timestamp increments determined based on the timestamps of the M received packets;
   a first timestamp increment is a timestamp difference between two consecutively received packets in the first audio stream, and the second timestamp increment is a timestamp difference between two consecutively received packets in the second audio stream; or the first timestamp increment is a timestamp difference between received adjacent packets in the first audio stream, and the second timestamp increment is a timestamp difference between received adjacent packets in the second audio stream; and
   determine the sampling frequency of the first audio stream based on the first timestamp increment group, and determining the sampling frequency of the second audio stream based on the second timestamp increment group.

11. The device according to claim 10, wherein the N packets are first N packets in the first audio stream that are received after the switching instruction is received, the M packets are first M packets in the second audio stream that are received after the switching instruction is received, and N is equal to M.

12. The device according to claim 11, wherein the first packet is a packet that is in the first audio stream and that is received when the sampling frequency of the first audio stream is determined, and the second packet is a packet that is in the second audio stream and that is received when audio information of the second audio stream is determined.

13. The device according to claim 10, wherein when determining the sampling frequency of the first audio stream based on the first timestamp increment group, the instructions further instruct the at least one processor to:
   perform linear fitting based on the N−1 first timestamp increments, a sequence number difference between two packets corresponding to each first timestamp increment, and theoretical values that are of a timestamp difference between adjacent packets and that respectively correspond to a plurality of theoretical sampling frequencies supported by the switching device, to obtain a plurality of first fitting errors;
   determine a theoretical value that is of a timestamp difference between adjacent packets and that corresponds to a minimum first fitting error in the plurality of first fitting errors; and
   use a theoretical sampling frequency corresponding to the theoretical value that is of a timestamp difference between adjacent packets and that corresponds to the minimum first fitting error as the sampling frequency of the first audio stream; or
   when determining the sampling frequency of the second audio stream based on the second timestamp increment group, the instructions further instruct the at least one processor to:
   perform linear fitting based on the M−1 second timestamp increments, a timestamp difference between two packets corresponding to each second timestamp increment, and theoretical values that are of a timestamp difference between adjacent packets and that respectively correspond to a plurality of theoretical sampling frequencies supported by the switching device, to obtain a plurality of second fitting errors;
   determine a theoretical value that is of a timestamp difference between adjacent packets and that corresponds to a minimum second fitting error in the plurality of second fitting errors; and
   use a theoretical sampling frequency corresponding to the theoretical value that is of a timestamp difference between adjacent packets and that corresponds to the minimum second fitting error as the sampling frequency of the second audio stream.

14. The device according to claim 9, wherein when determining the parameter value of the switching point of the first audio stream based on the synchronization relationship and the timestamp of the first packet, and determining the parameter value of the switching point of the second audio stream based on the synchronization relationship and the timestamp of the second packet, the instructions further instruct the at least one processor to:
   determine the parameter value of the switching point of the first audio stream based on the synchronization relationship, the timestamp of the first packet, and packet time of the first audio stream, and
   determine the parameter value of the switching point of the second audio stream based on the synchronization relationship, the timestamp of the second packet, and packet time of the second audio stream, wherein
   the packet time of the first audio stream is determined based on the timestamps of the N packets, and the packet time of the second audio stream is determined based on the timestamps of the M packets.

15. The device according to claim 14, wherein a packet timestamp of the switching point of the first audio stream and a packet timestamp of the switching point of the second audio stream meet following condition:
   if it is determined, based on the unified timestamp of the first packet and the unified timestamp of the second packet, that the first audio stream and the second audio stream are synchronized, $TS_i\_SW=TS_i+K1/\text{ti\_pkt}*dts_i$ and $TS_o\_SW=TS_o+K1/\text{to\_pkt}*dts_o$; or
   if the unified timestamp of the first packet is later than the unified timestamp of the second packet, $TS_i\_SW=TS_i+K1/\text{ti\_pkt}*dts_i$ and $TS_o\_SW=TS_o+(t_{nsync}+K1)/\text{to\_pkt}*dts_o$; or
   if the unified timestamp of the first packet is earlier than the unified timestamp of the second packet, $TS_i\_SW=TS_i+(t_{nsync}+K2)/\text{ti\_pkt}*dts_i$ and $TS_o\_SW=TS_o+K2/\text{to\_pkt}*dts_o$, wherein
   $t_{nsync}=|TS_o^0-TS_i^0|/f_{io}$, $TS_o^0$ represents the unified timestamp of the first packet, $TS_i^0$ represents the unified timestamp of the second packet, $f_{io}$ represents the reference sampling frequency, $TS_i\_SW$ represents the timestamp of the switching point of the second audio stream, $TS_i$ represents the un-unified timestamp of the second packet, ti_pkt represents the packet time of the second audio stream, $dts_i$ represents a theoretical value that is of a timestamp difference between adjacent packets and that corresponds to the sampling frequency of the second audio stream, $TS_o\_SW$ represents the timestamp of the switching point of the first audio stream, $TS_o$ represents the un-unified timestamp of the first audio stream, to_pkt represents the packet time of the first audio stream, $dts_o$ represents a theoretical value that is of a timestamp difference between adjacent packets and that corresponds to the sampling frequency of the first audio stream, K1 represents first preset duration, and K2 represents second preset duration.

16. The device according to claim 14, wherein packet time of a to-be-determined audio stream meets the following condition, and the to-be-determined audio stream is the first audio stream or the second audio stream:

if $\overline{dTS}_{real} < dTS_{thres}$, the packet time of the to-be-determined audio stream is a first value; or if $\overline{dTS}_{real} \geq dTS_{thres}$, the packet time of the to-be-determined audio stream is a second value, wherein $$\overline{dTS}_{real} = \frac{\sum_{i=1}^{w} dTS_i}{\sum_{i=1}^{w} dSEQ_i}, \overline{dTS}_{real}$$

represents a timestamp increment average determined based on a timestamp increment group of the to-be-determined audio stream, $dTS_{thres}$ is related to theoretical values that are of a timestamp difference between adjacent packets and that correspond to different packet time, $dTS_i$ represents an $i^{th}$ timestamp increment in the timestamp increment group of the to-be-determined audio stream, $dSEQ_i$ represents a sequence number difference between two packets corresponding to the $i^{th}$ timestamp increment, and w represents a quantity of timestamp increments in the timestamp increment group of the to-be-determined audio stream.

* * * * *